(12) United States Patent
Kodaira et al.

(10) Patent No.: US 8,200,392 B2
(45) Date of Patent: Jun. 12, 2012

(54) VEHICULAR STEERING CONTROL DEVICE

(75) Inventors: Takahiro Kodaira, Machida (JP);
Hideki Sakai, Susono (JP); Yoji Kunihiro, Gotenba (JP); Motoshi Oki, Yokohama (JP); Kentaro Horiuchi, Susono (JP); Etsuo Katsuyama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 683 days.

(21) Appl. No.: 12/160,495

(22) PCT Filed: May 10, 2007

(86) PCT No.: PCT/JP2007/059646
§ 371 (c)(1),
(2), (4) Date: Apr. 2, 2009

(87) PCT Pub. No.: WO2007/129750
PCT Pub. Date: Nov. 15, 2007

(65) Prior Publication Data
US 2010/0161178 A1    Jun. 24, 2010

(30) Foreign Application Priority Data
May 10, 2006    (JP) ................................. 2006-131511

(51) Int. Cl.
*A01B 69/00* (2006.01)
*B62D 6/00* (2006.01)
*B62D 11/00* (2006.01)
(52) U.S. Cl. .......................................... 701/41; 701/42
(58) Field of Classification Search .................. None
See application file for complete search history.

(56) References Cited

U.S. PATENT DOCUMENTS

| | | | | |
|---|---|---|---|---|
| 4,021,007 A | * | 5/1977 | Coxe | 244/3.13 |
| 4,718,685 A | * | 1/1988 | Kawabe et al. | 180/415 |
| 4,767,588 A | * | 8/1988 | Ito | 701/41 |
| 4,834,204 A | * | 5/1989 | Ito et al. | 180/415 |
| 4,949,261 A | * | 8/1990 | Ito et al. | 701/41 |
| 5,018,070 A | * | 5/1991 | Eguchi | 701/42 |
| 5,508,929 A | * | 4/1996 | Harada | 701/48 |
| 5,548,536 A | * | 8/1996 | Ammon | 702/148 |
| 5,576,957 A | * | 11/1996 | Asanuma et al. | 701/42 |
| 5,627,754 A | * | 5/1997 | Asanuma et al. | 701/41 |
| 5,652,383 A | * | 7/1997 | Yamamoto et al. | 73/495 |
| 5,694,321 A | * | 12/1997 | Eckert et al. | 701/91 |
| 5,701,248 A | * | 12/1997 | Wanke | 701/70 |
| 5,710,705 A | * | 1/1998 | Eckert | 701/83 |

(Continued)

FOREIGN PATENT DOCUMENTS
JP    63 291776    11/1988
(Continued)

*Primary Examiner* — Khoi Tran
*Assistant Examiner* — Bhavesh V Amin
(74) *Attorney, Agent, or Firm* — Oblon, Spivak, McClelland, Maier & Neustadt, L.L.P.

(57) ABSTRACT

A vehicle steering control apparatus (10) is provided with: a steering force applying device (15, 30) for applying a steering force front wheels (5, 6); and a lateral force detecting device (42) for detecting a lateral force of each of the front wheels and rear wheels (7, 8), the steering force applying device applying, to the front wheels, a convergent steering force which steers the front wheels in a direction in which yaw oscillation converges, if a ratio of the lateral force (Fr) of the rear wheels to the lateral force (Ff) of the front wheels becomes a ratio of possibly causing the yaw oscillation in a vehicle (1).

25 Claims, 13 Drawing Sheets

U.S. PATENT DOCUMENTS

| | | | |
|---|---|---|---|
| 5,732,377 A * | 3/1998 | Eckert | 701/83 |
| 5,957,987 A * | 9/1999 | Sudo et al. | 701/41 |
| 6,154,696 A * | 11/2000 | Nishi et al. | 701/41 |
| 6,502,029 B2 * | 12/2002 | O'Dea | 701/71 |
| 6,512,973 B2 * | 1/2003 | O'Dea et al. | 701/71 |
| 6,542,800 B2 * | 4/2003 | Kawazoe et al. | 701/41 |
| 6,584,397 B2 * | 6/2003 | Tanaka et al. | 701/70 |
| 6,625,529 B2 * | 9/2003 | Obata et al. | 701/41 |
| 6,705,424 B2 * | 3/2004 | Ogawa et al. | 180/446 |
| 6,968,920 B2 * | 11/2005 | Barton et al. | 180/446 |
| 7,278,511 B1 * | 10/2007 | Gass et al. | 180/409 |
| 7,418,329 B2 * | 8/2008 | Yasui et al. | 701/41 |
| 2002/0087248 A1 * | 7/2002 | O'Dea et al. | 701/71 |
| 2002/0095252 A1 * | 7/2002 | O'Dea | 701/71 |
| 2002/0139599 A1 * | 10/2002 | Lu et al. | 180/282 |
| 2005/0189163 A1 * | 9/2005 | Barton et al. | 180/446 |
| 2005/0200088 A1 * | 9/2005 | Sawada et al. | 280/5.507 |
| 2007/0239333 A1 * | 10/2007 | Galkowski et al. | 701/41 |

FOREIGN PATENT DOCUMENTS

| | | |
|---|---|---|
| JP | 4 108080 | 4/1992 |
| JP | 4 307348 | 10/1992 |
| JP | 9 240458 | 9/1997 |
| JP | 2003 267244 | 9/2003 |
| JP | 2004 203112 | 7/2004 |
| JP | 2005 193779 | 7/2005 |

* cited by examiner

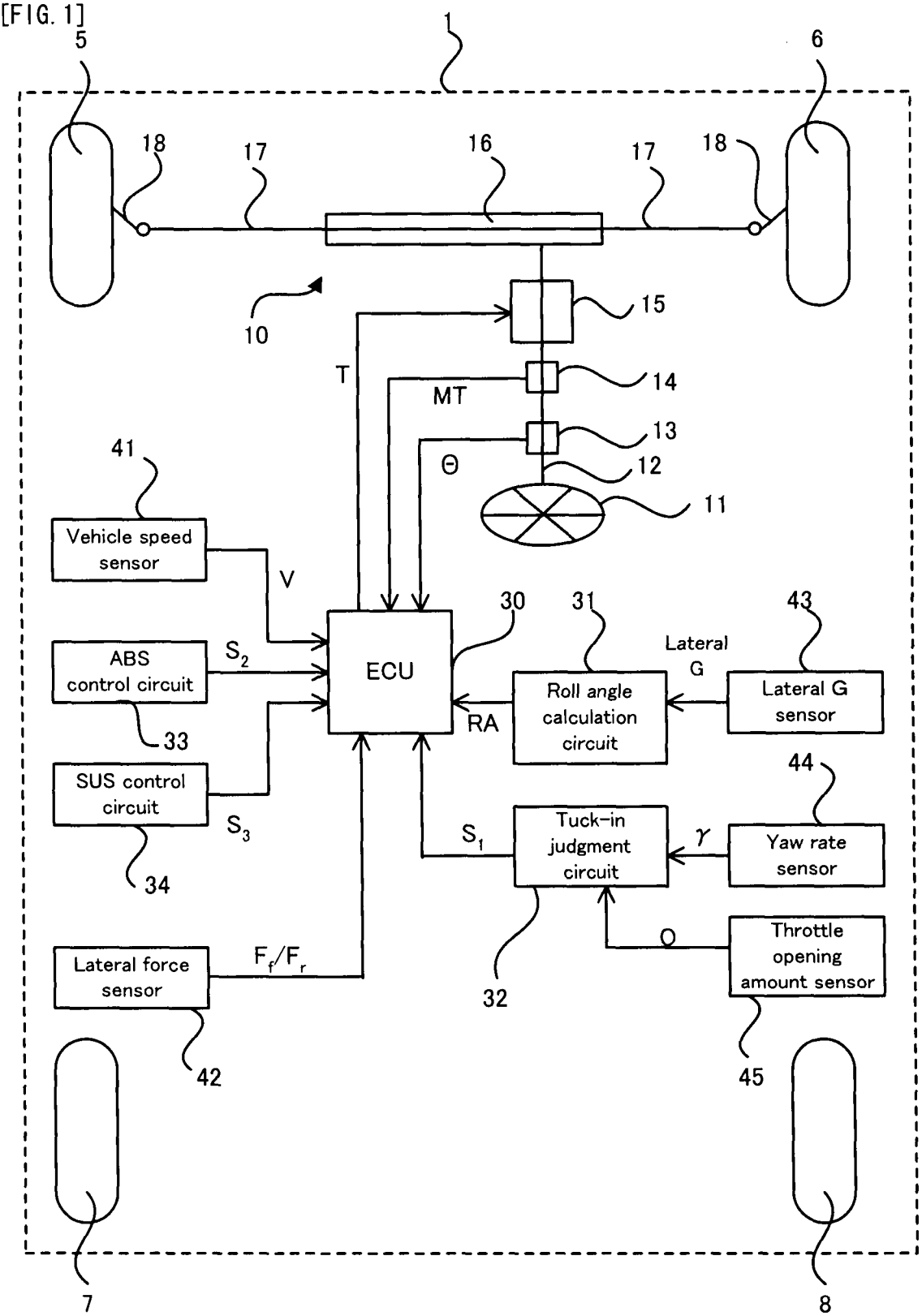
[FIG. 1]

[FIG. 2]
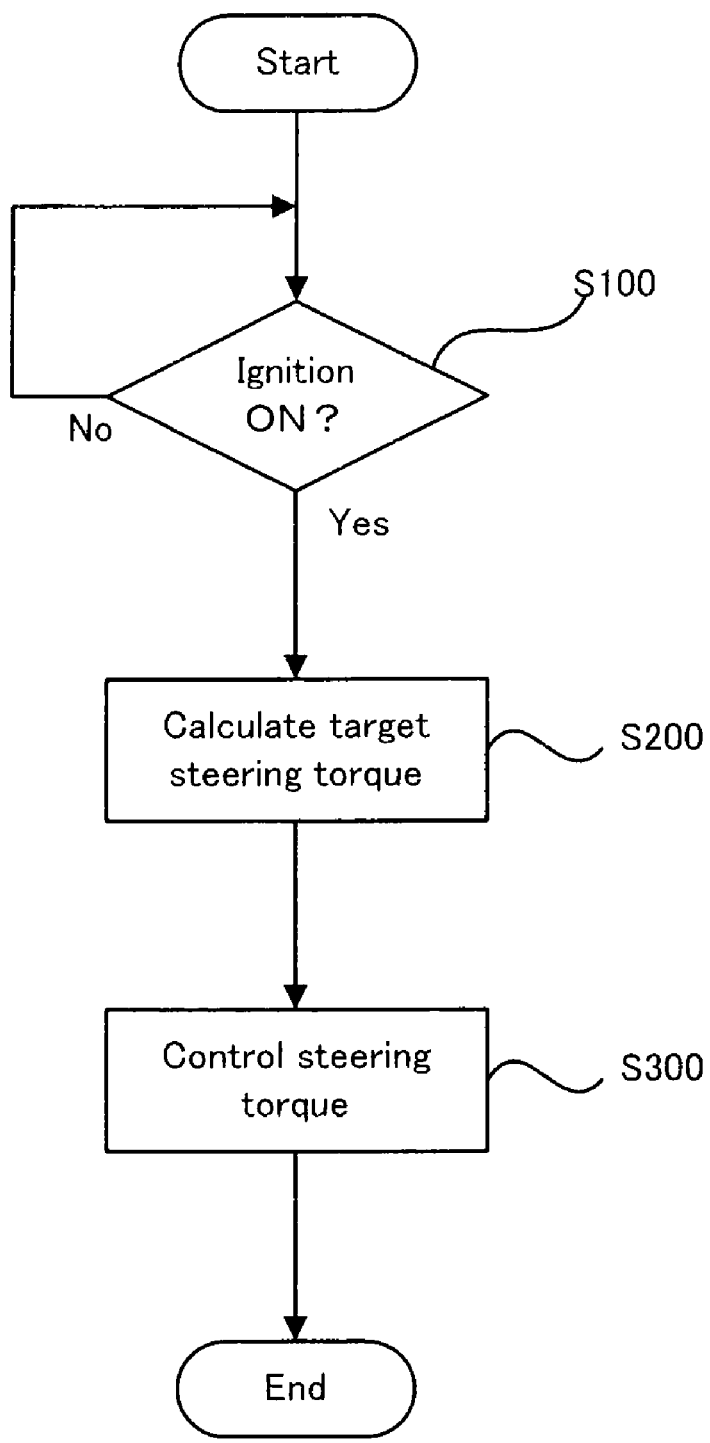

[FIG. 3]
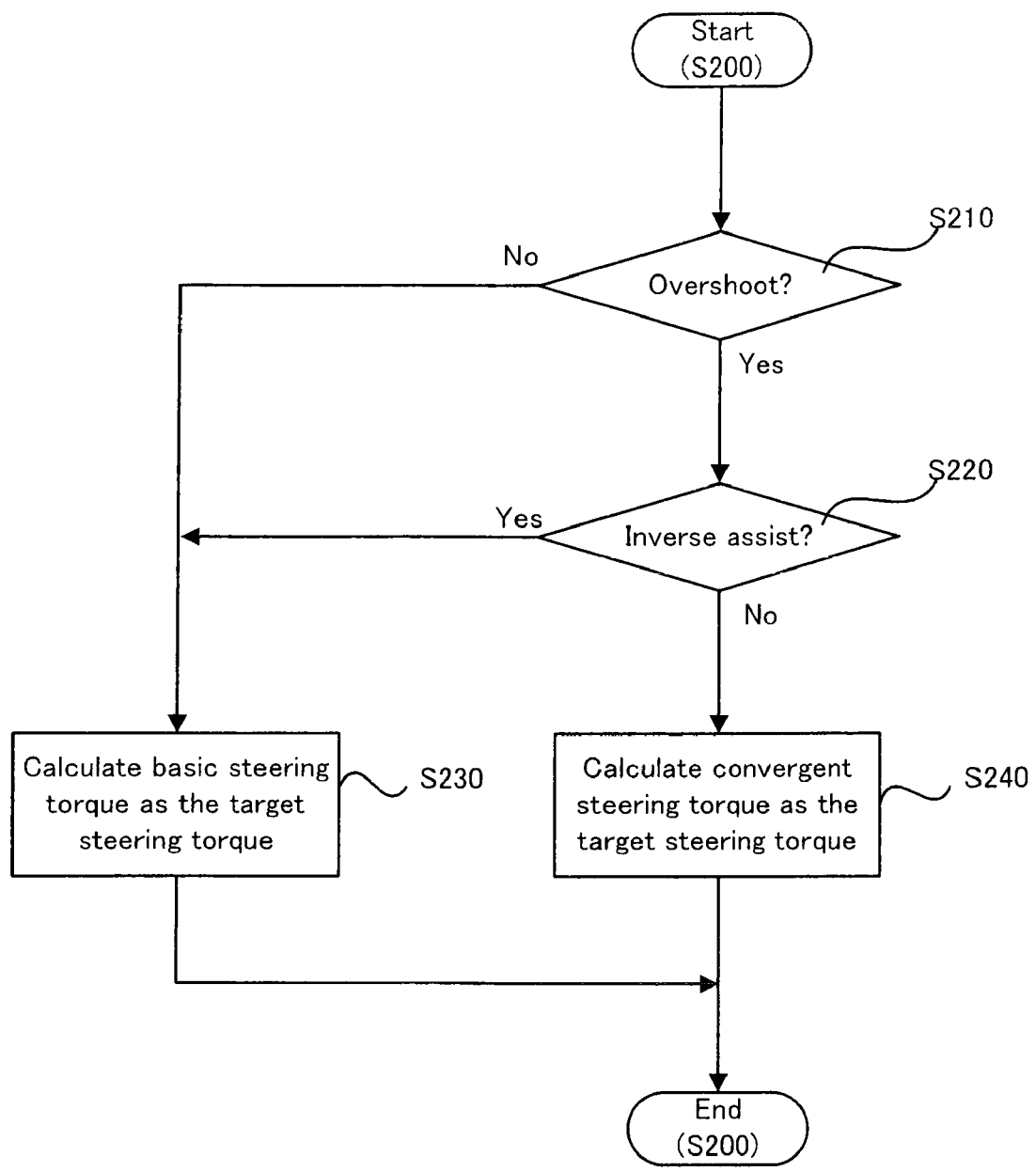

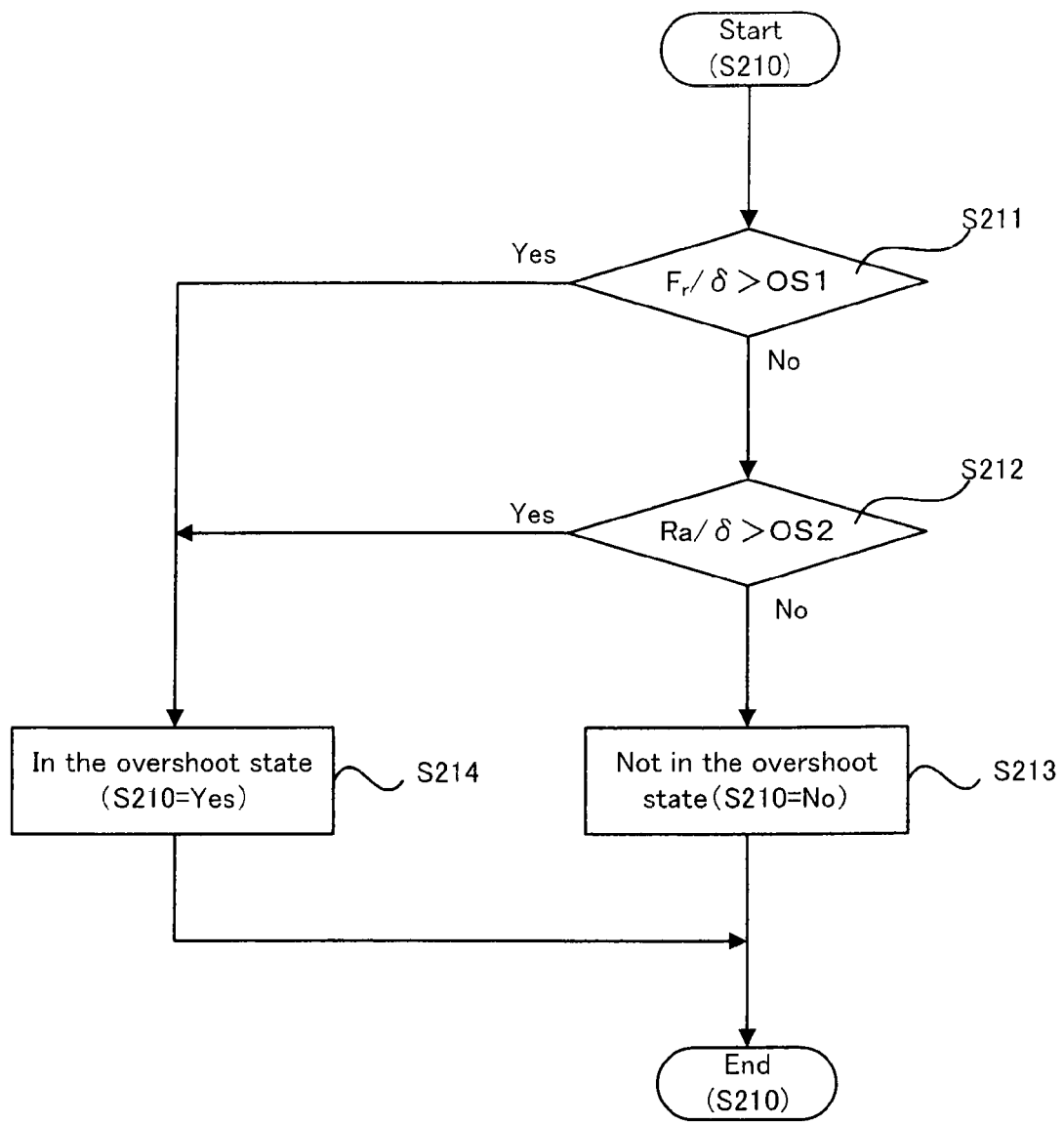
[FIG. 4]

[FIG. 5]
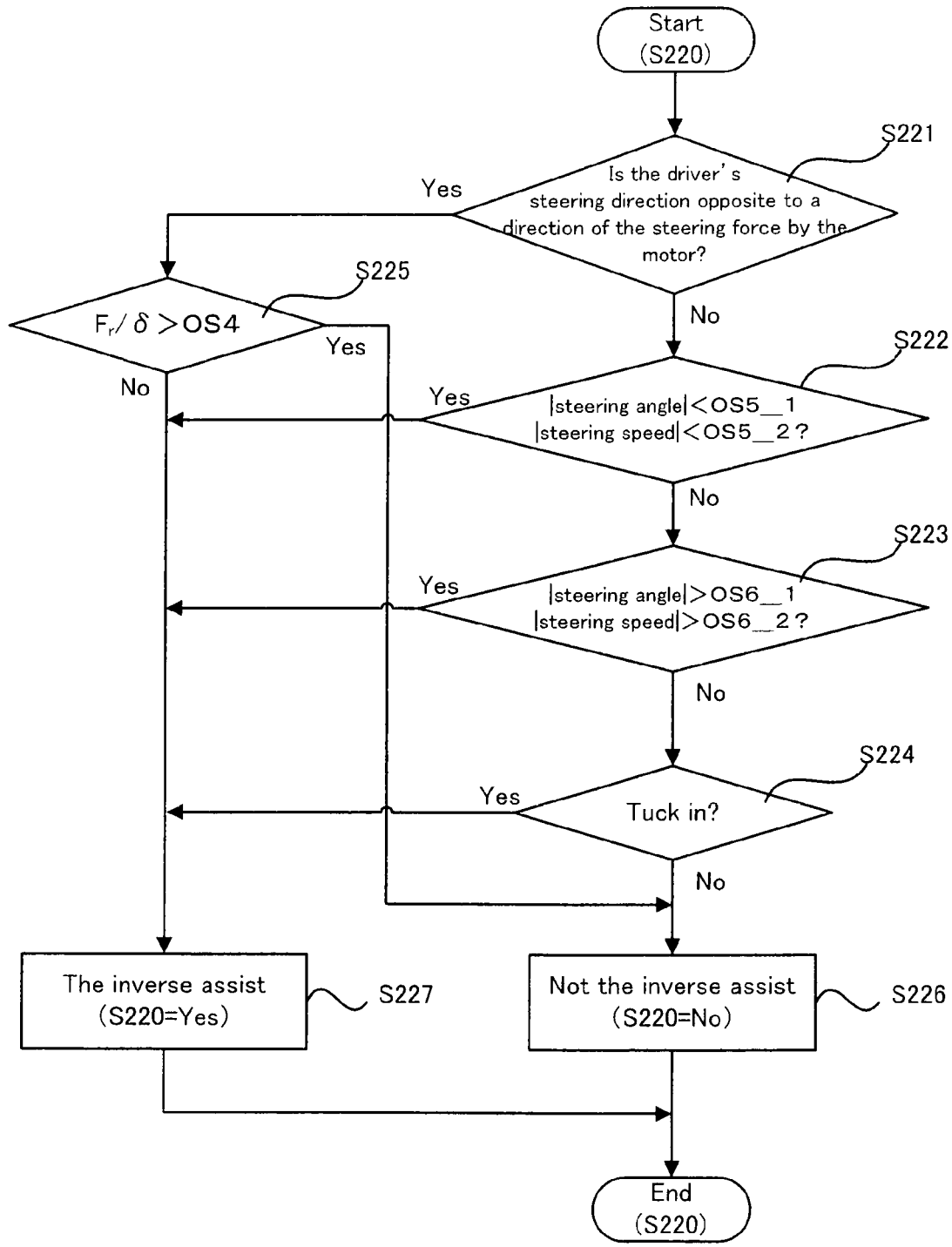

[FIG. 6]
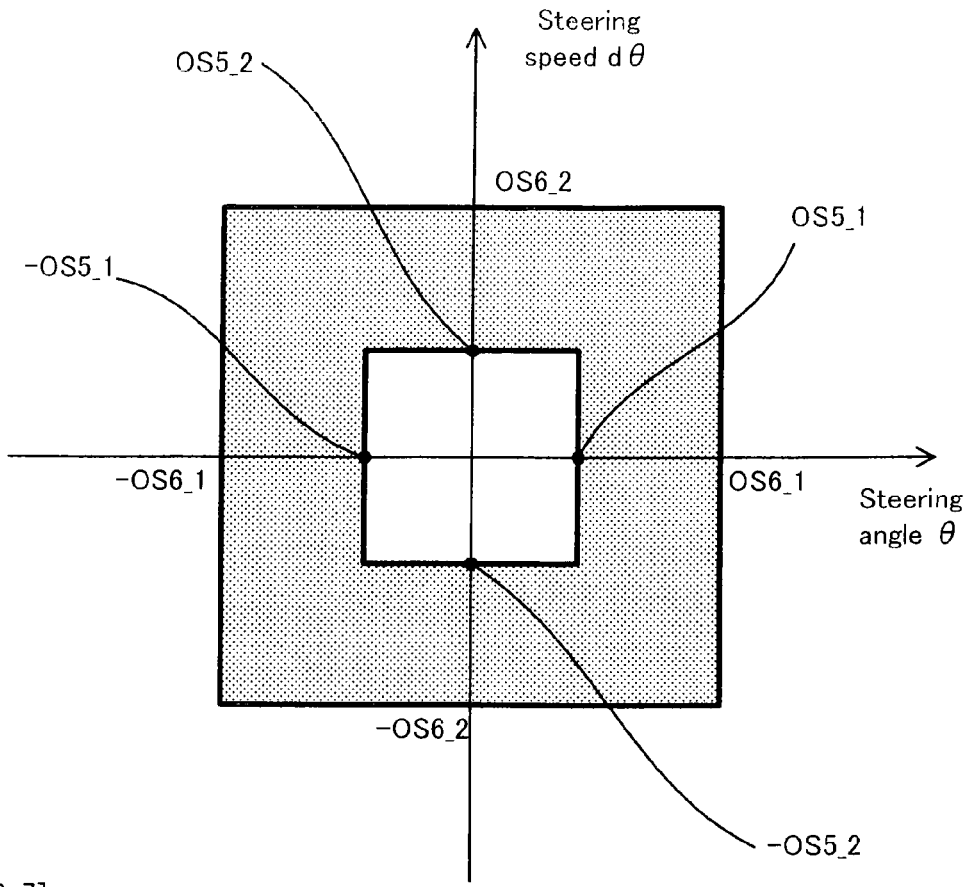
[FIG. 7]
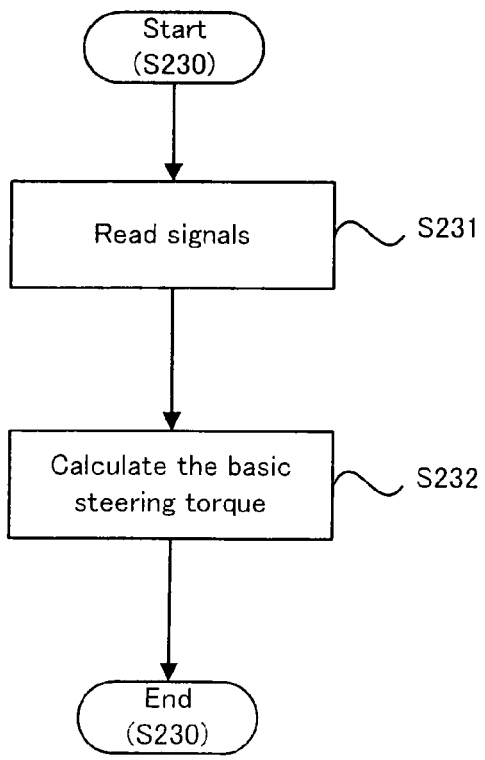

[FIG. 8]
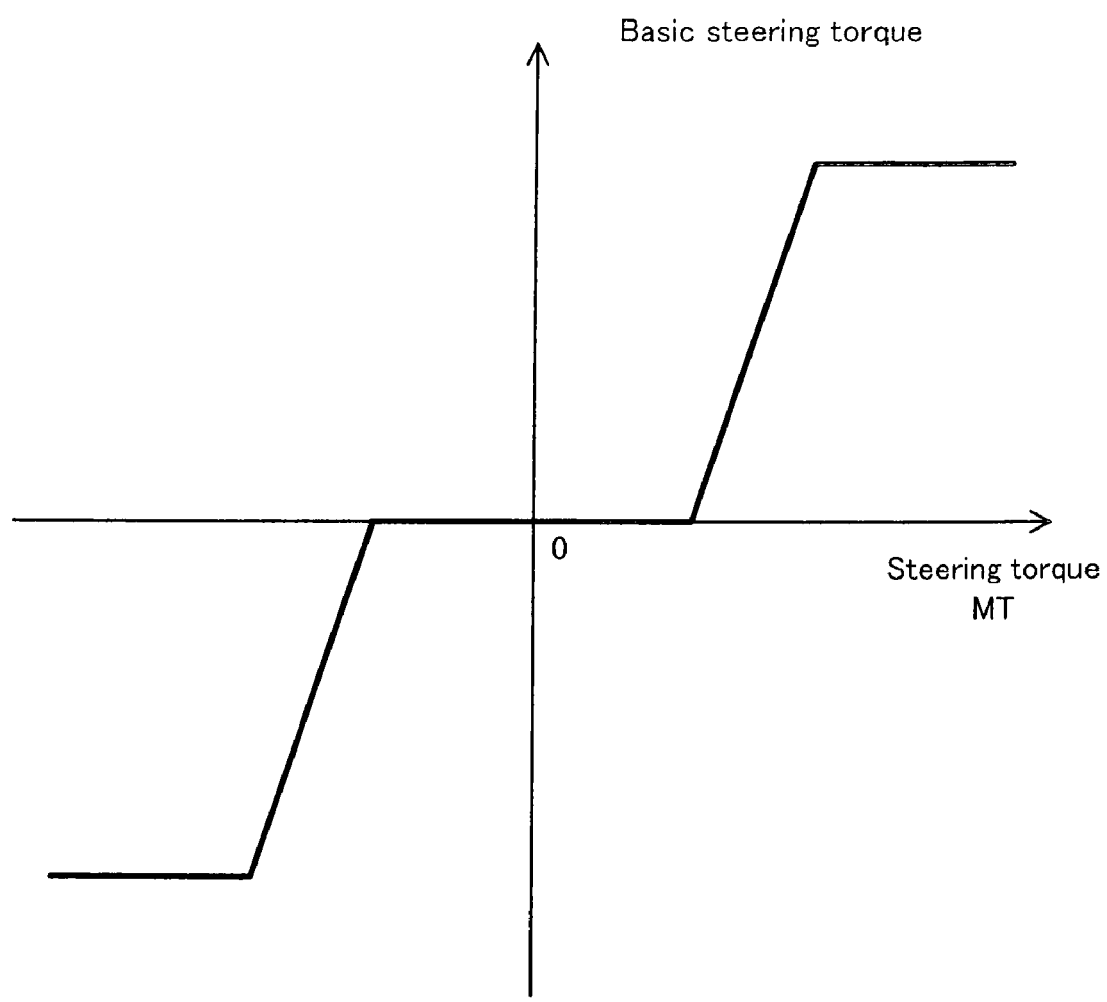

[FIG. 9]
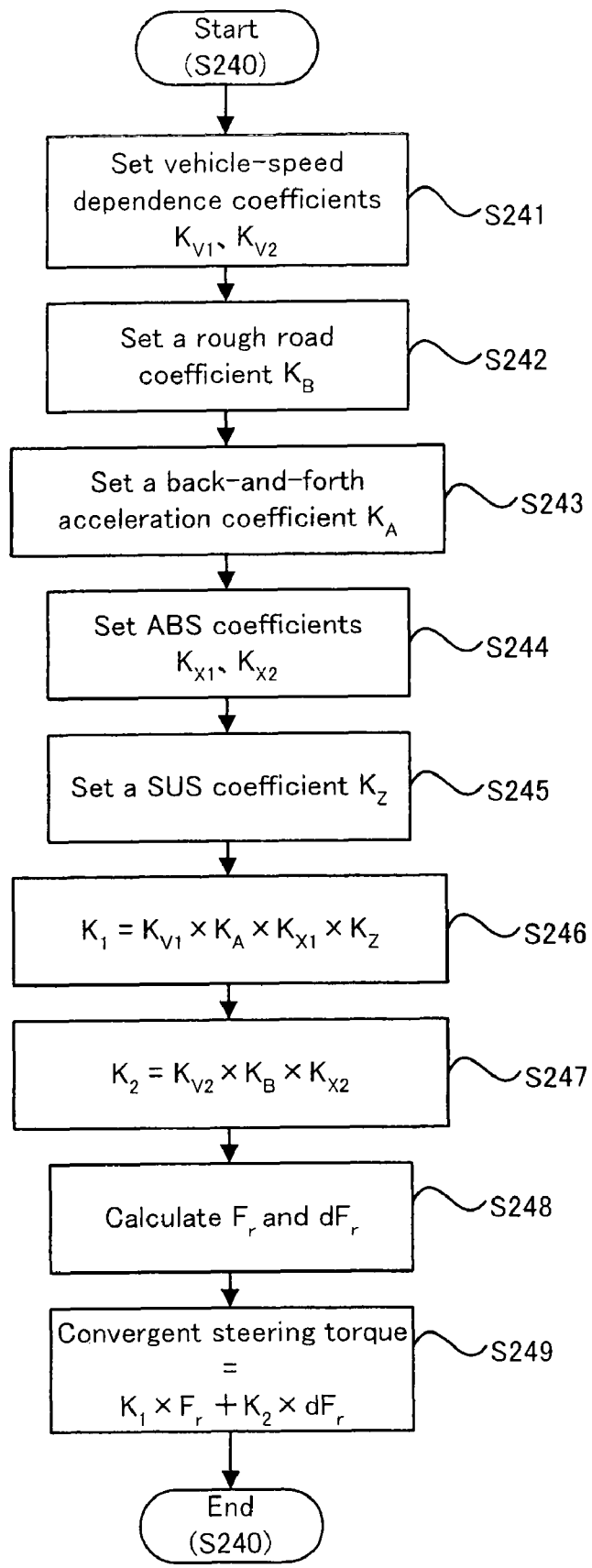

[FIG. 10]
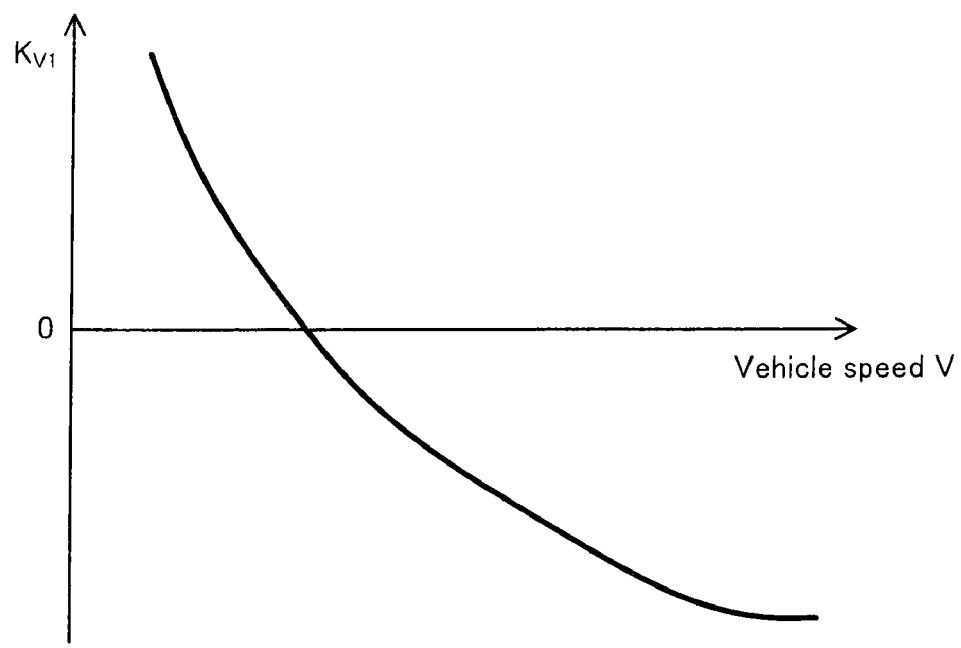
[FIG. 11]
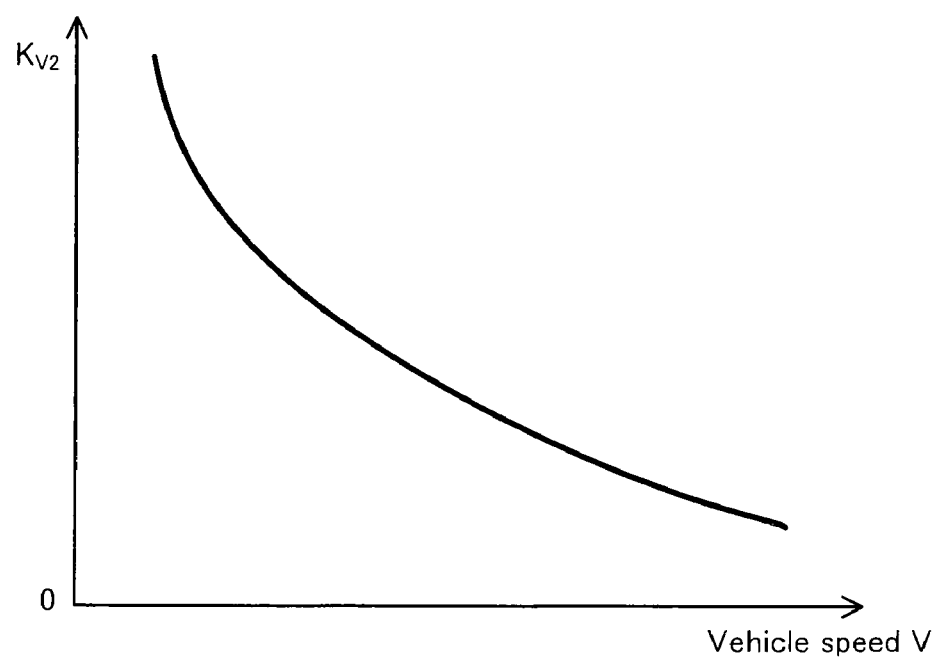

[FIG. 12]
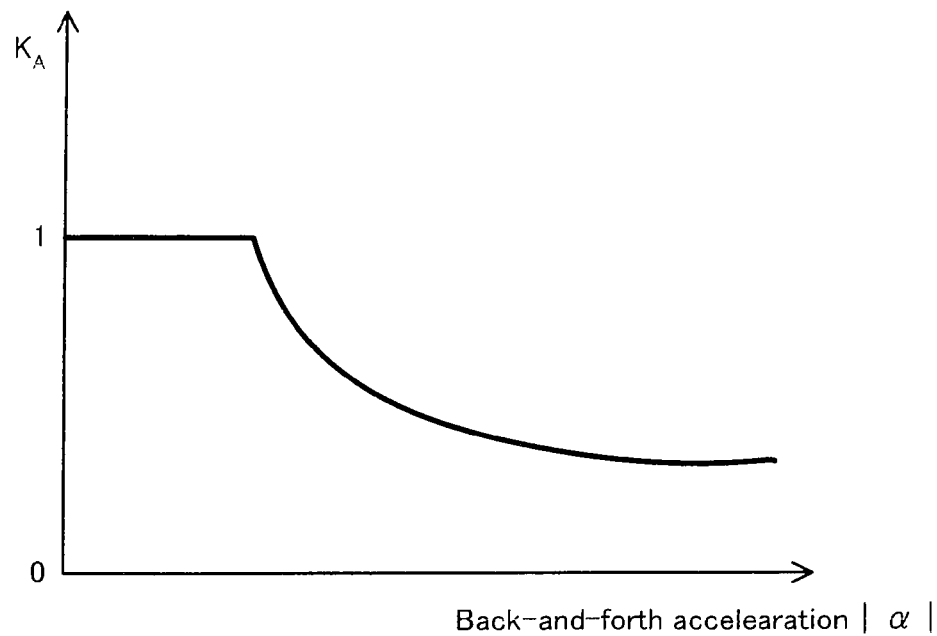
[FIG. 13]
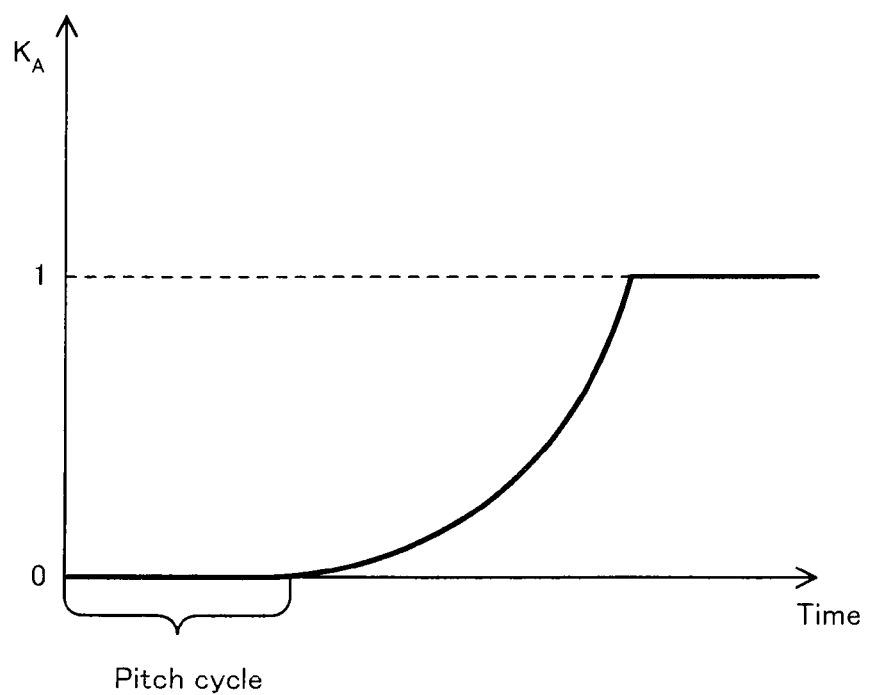

[FIG. 14]
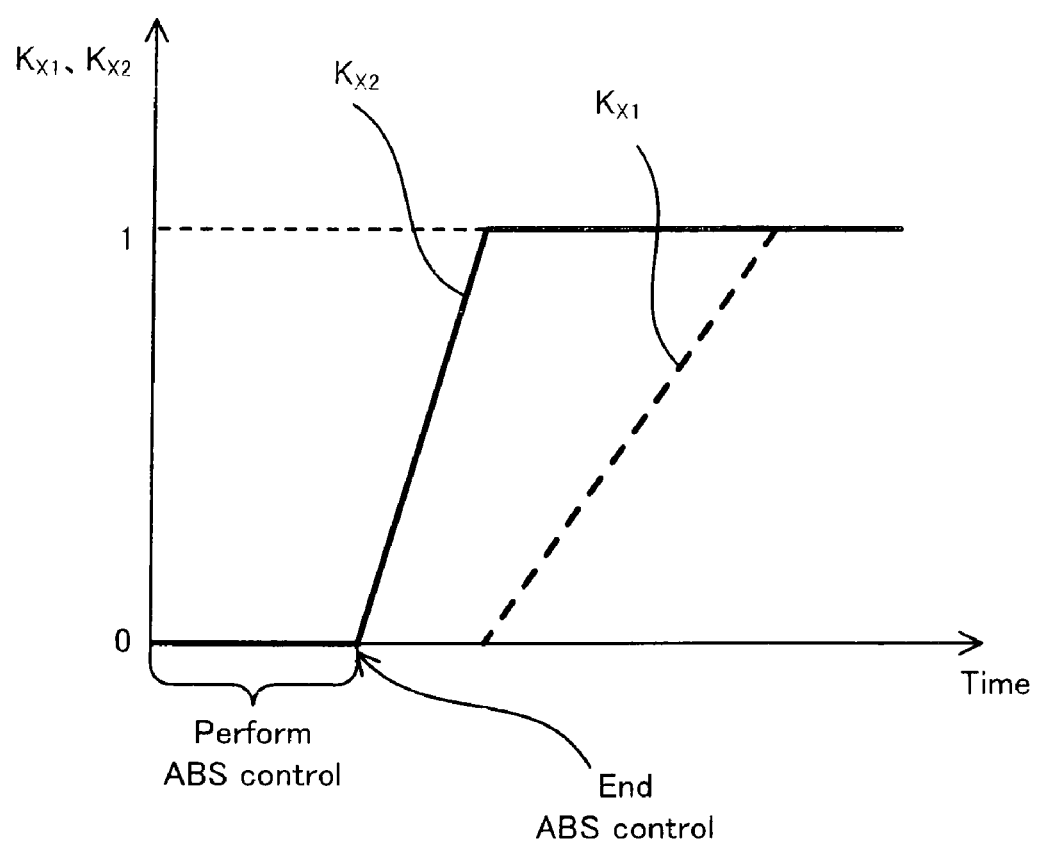

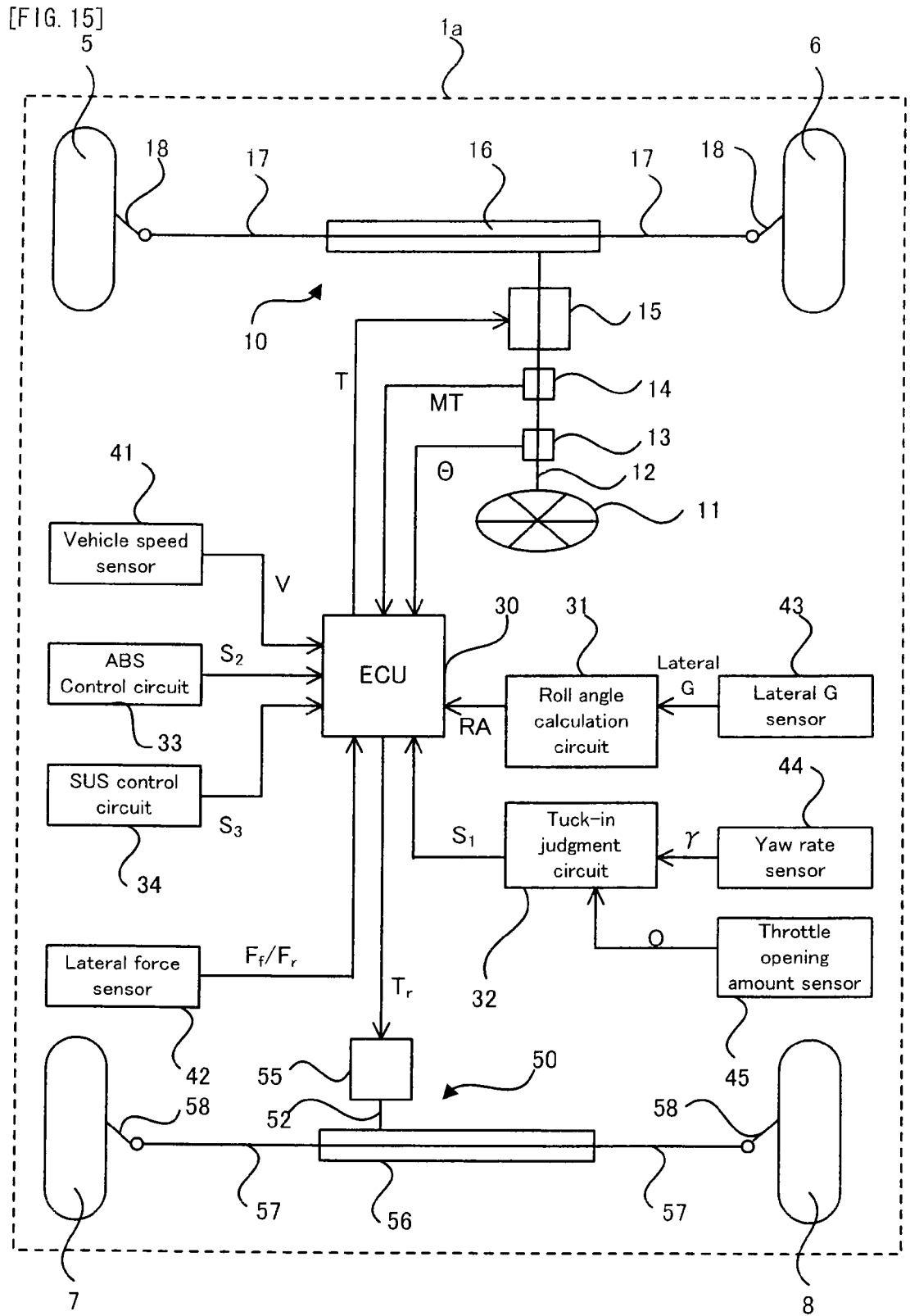
[FIG. 15]

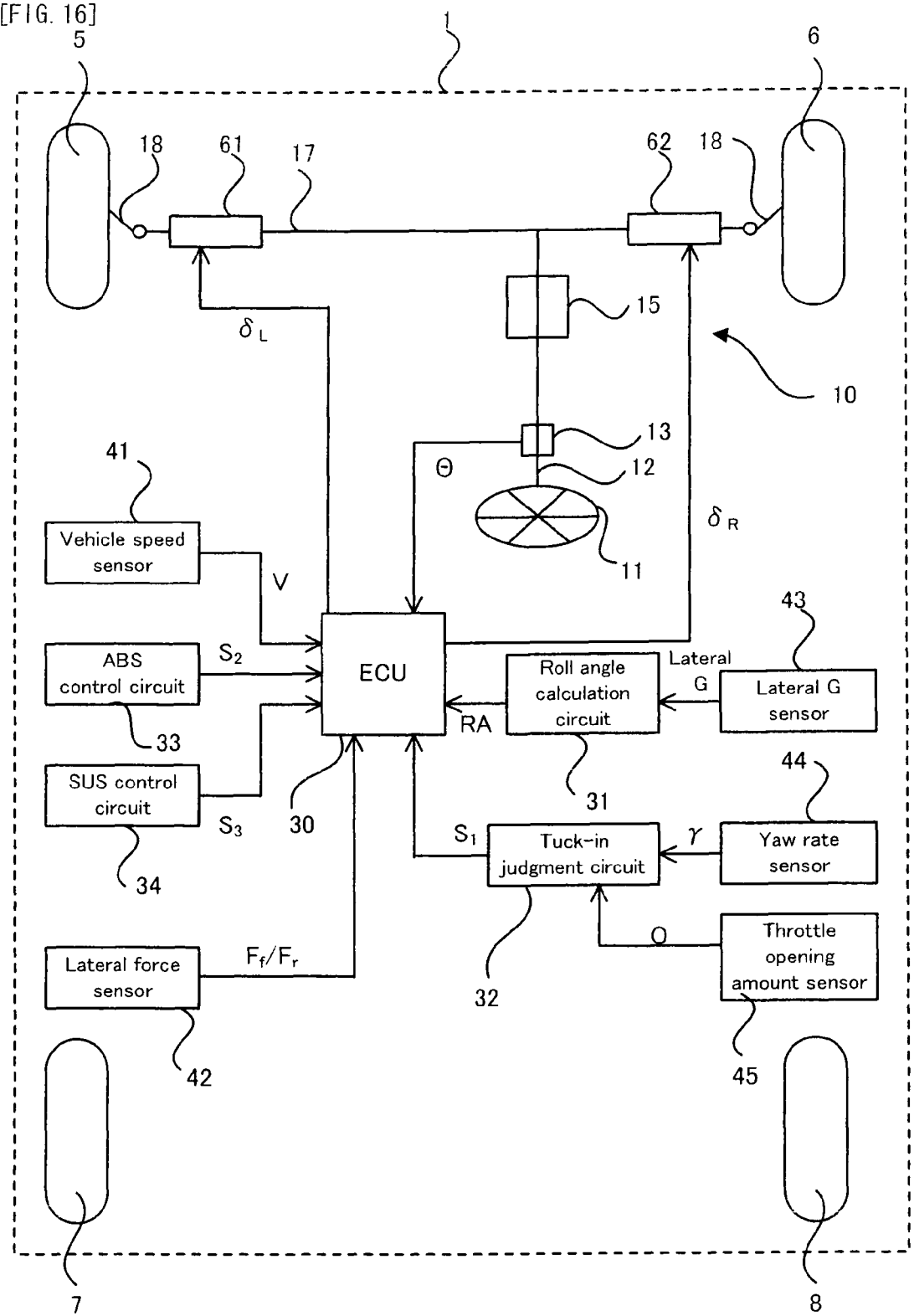

VEHICULAR STEERING CONTROL DEVICE

TECHNICAL FIELD

The present invention relates to a control apparatus for a power steering apparatus, which is used for a power steering apparatus of a vehicle.

BACKGROUND ART

A vehicle, such as an automobile, uses an electric power steering apparatus which applies steering assist torque to a steering mechanism including front wheels, by driving an electric motor in accordance with steering torque applied by a driver (or crew) operating a steering wheel. In such an electric power steering apparatus, as disclosed in a patent document 1, phase compensation (i.e. damping control) is performed on a target value of a base assist current, which is supplied to the electric motor in accordance with the applied steering assist torque. By virtue of this structure, a damping component can be considered, which allows the convergence of the steering to be improved.

Patent Document 1: Japanese Patent Application Laid Open No. 2004-203112

DISCLOSURE OF INVENTION

Subject to be Solved by the Invention

In order to improve the convergence of the vehicle as described above, a possible measure is to increase the aforementioned damping control. However, if the damping control is increased, a driver's steering feeling of the steering wheel becomes bad. More specifically, the increase of the damping control gives a viscous or heavy impression in operating the steering wheel, and gives such an impression that the vehicle does not turn as the driver desires. On the other hand, if the damping control is reduced, steering vibration and yaw oscillation are coupled to each other depending on the vehicle feature (or structure or the like), which may deteriorate the convergence of the whole vehicle. That is, the phase of the steering vibration and the phase of the yaw oscillation of the vehicle are in a reverse-phase relationship, which possibly increases the vibration applied to the whole vehicle.

In view of the above-exemplified problems, it is therefore an object of the present invention to provide a vehicle steering control apparatus which can improve the convergence of a vehicle while improving the convergence of steering.

Means for Solving the Subject

(1) Vehicle Steering Control Apparatus

The above object of the present invention can be achieved by a vehicle steering control apparatus provided with: a steering force applying device for applying a steering force at least to front wheels; and a lateral force detecting device for detecting a lateral force of each of the front wheels (e.g. front tires) and rear wheels (e.g. rear tires), the steering force applying device applying, to the front wheels, a convergent steering force which steers the front wheels in a direction in which yaw oscillation converges, if a ratio of the lateral force of the rear wheels to the lateral force of the front wheels becomes a ratio of possibly causing the yaw oscillation in a vehicle.

According to the vehicle steering control apparatus of the present invention, the front wheels can be steered so that the yaw oscillation converges, if the ratio of the lateral force of the rear wheels to the lateral force of the front wheels becomes the ratio which possibly causes the yaw oscillation in the vehicle. By this, even if there is the possibility that the lateral force generated on the rear wheels vibrates the front wheels or if there is the possibility that the yaw oscillation occurs in the vehicle, it is possible to prevent the steering vibration and the yaw oscillation from being coupled to each other. This can result in the convergence in the vibration of the front wheels. That is, it is possible to improve the convergence of the vehicle while improving the convergence of the steering.

Incidentally, the "front wheels" of the present invention indicate wheels located relatively on the front side with respect to the travelling direction of the vehicle, and the "rear wheels" of the present invention indicate wheels located relatively on the rear side with respect to the travelling direction of the vehicle.

In one aspect of the vehicle steering control apparatus of the present invention, the steering force applying device (i) applies, as the convergent steering force, a steering force which steers the front wheels in a neutral direction, compared to a case that the ratio of the lateral force of the rear wheels to the lateral force of the front wheels does not become the ratio of possibly causing the yaw oscillation in the vehicle, if the steering by a driver of the vehicle is in a turning or cutting state, and (ii) applies as the convergent steering force, a steering force which steers the front wheels in an end direction, compared to the case that the ratio of the lateral force of the rear wheels to the lateral force of the front wheels does not become the ratio of possibly causing the yaw oscillation in the vehicle, if the steering by the driver of the vehicle is in a returning or reversing state.

According to this aspect, if the ratio of the lateral force of the rear wheels to the lateral force of the front wheels becomes the ratio of possibly which causes the yaw oscillation in the vehicle, the front wheels can be steered in the neutral direction or the end direction, compared to the case that there is no possibility that the lateral force generated on the rear wheels vibrates the front wheels or the case that there is no possibility that the yaw oscillation occurs in the vehicle, in accordance with the steering direction by a driver (i.e. in accordance whether the steering is turned or returned). By this, even if there is the possibility that the lateral force of the rear wheels vibrates the front wheels or even if there is the possibility that the yaw oscillation occurs in the vehicle, it is possible to prevent the steering vibration and the yaw oscillation from being coupled to each other. This can result in the convergence in the vibration of the front wheels. That is, it is possible to improve the convergence of the vehicle while improving the convergence of the steering.

In another aspect of the vehicle steering control apparatus of the present invention, the steering force applying device applies the steering force so as to control a rudder angle of the front wheels.

According to this aspect, the aforementioned effect can be received in a so-called active steering mechanism (i.e. a steering mechanism for performing steering control by inputting a rudder angle).

In another aspect of the vehicle steering control apparatus of the present invention, the steering force applying device controls the steering force applied to the front wheels on the basis of steering torque according to the steering operation of a driver of the vehicle.

According to this aspect, compared to the case that the rudder angle can be directly controlled, it is possible to receive the aforementioned benefit while improving a steering feeling.

(2) Judgment of Application of Convergent Steering Force

In another aspect of the vehicle steering control apparatus of the present invention, the steering force applying device applies the convergent steering force, if the ratio of the lateral force of the rear wheels to the lateral force of the front wheels is larger than a first predetermined threshold value.

According to this aspect, it can be judged that there is the possibility that the yaw oscillation occurs in the vehicle, if the ratio of the lateral force of the rear wheels to the lateral force of the front wheels is larger than the first predetermined threshold value.

Incidentally, the yaw oscillation in the vehicle often occurs mainly after the turning of the vehicle. Thus the judgment whether or not there is the possibility that the yaw oscillation occurs in the vehicle may be performed in the turning of the vehicle.

In an aspect of the vehicle steering control apparatus in which the convergent steering force is applied if the ratio of the lateral force of the rear wheels to the lateral force of the front wheels is larger than the first predetermined threshold value, as described above, the steering force applying device may apply the convergent steering force, if a ratio of the lateral force of the rear wheels to a rudder angle of the front wheels is larger than a second predetermined threshold value.

By virtue of such construction, because the lateral force of the front wheels can be estimated or calculated from the rudder angle of the front wheels, it can be judged that there is the possibility that the yaw oscillation occurs in the vehicle, if the ratio of the lateral force of the rear wheels to the rudder angle of the front wheels is larger than the second predetermined threshold value.

In another aspect of the vehicle steering control apparatus of the present invention, the steering force applying device applies the convergent steering force, if a ratio of a roll angle of the vehicle to a rudder angle of the front wheels is larger than a third predetermined threshold value.

In the vehicle with a relatively high vehicle height, such as a minivan and a SUV (Sport Utility Vehicle), the generation of the lateral force of the front wheels or the rear wheels is delayed because of after-shaking or reactive-shaking in the roll direction. Thus, according to this aspect, even in the vehicle with the relatively high vehicle height, it is possible to preferably judge whether or not there is the possibility that the yaw oscillation occurs in the vehicle.

(3) Calculation of Convergent Steering Force

In another aspect of the vehicle steering control apparatus of the present invention, the steering force applying device calculates the convergent steering force on the basis of each of a proportional value of the lateral force of the rear wheels and a differential value of the lateral force of the rear wheels.

According to this aspect, it is possible to preferably calculate the convergent steering force. Incidentally, the sum of the proportional value of the lateral force of the rear wheels and the differential value of the lateral force of the rear wheels may be calculated as the convergent steering force.

In another aspect of the vehicle steering control apparatus of the present invention, the steering force applying device corrects the convergent steering force in accordance with a speed of the vehicle.

According to this aspect, the vehicle feature can be stabilized even if the speed of the vehicle changes. Specifically, as the speed of the vehicle increases, the convergent steering force may be reduced.

Incidentally, at least one of the proportional value of the lateral force of the rear wheels and the differential value of the lateral force of the rear wheels, which is a basis in calculating the convergent steering force, may be corrected in accordance with the speed of the vehicle. In this case, a coefficient (in other words, gain) for at least one of the proportional value of the lateral force of the rear wheels and the differential value of the lateral force of the rear wheels may be corrected in accordance with the speed of the vehicle when the convergent steering force is calculated. Moreover, as the speed of the vehicle increases, the coefficient may be further reduced. Furthermore, sign of the coefficient for proportional value of the lateral force may be reversed at a certain speed of the vehicle in a neutral steering state.

In an aspect of the vehicle steering control apparatus in which the convergent steering force is corrected in accordance with the speed of the vehicle, as described above, the steering force applying device may reduce the convergent steering force, if the vehicle is driving on a rough road.

By virtue of such construction, even if the speed of the vehicle significantly changes on the rough road (specifically, e.g. an uneven road, a low μ road, or the like), the convergent steering force can be applied so as to realize relatively preferable steering.

In an aspect of the vehicle steering control apparatus in which the convergent steering force is reduced if the vehicle is driving on the rough road, as described above, the steering force applying device may calculate the convergent steering force on the basis of each of a proportional value of the lateral force of the rear wheels and a differential value of the lateral force of the rear wheels, while reducing a contribution ratio of the differential value of the lateral force of the rear wheels, compared to a case that the vehicle is driving on a normal road, if the vehicle is driving on the rough road.

By virtue of such construction, it is possible to calculate the convergent steering force by reducing the contribution ratio of the differential value of the lateral force whose noise increases because of the driving on the rough road. Thus, it is possible to prevent the convergent steering force which changes excessively or significantly from being applied.

Incidentally, the convergent steering force may be calculated on the basis of the proportional value of the lateral force by setting the contribution ratio of the differential value of the lateral force to 0.

In another aspect of the vehicle steering control apparatus of the present invention, the steering force applying device calculates the convergent steering force on the basis of a motion model of the vehicle in a planar direction.

According to this aspect, it is possible to calculate the convergent steering force, highly accurately, on the basis of the momentum of the vehicle generated by the vehicle. That is, instead of calculating the steering force merely from a mapping table or the like, the steering force can be calculated theoretically on the basis of the actual motion model of the vehicle. Thus, the convergent steering force can be calculated, highly accurately.

In an aspect of the vehicle steering control apparatus in which the convergent steering force is calculated on the basis of the motion model of the vehicle in the planar direction, as described above, the steering force applying device may calculate the convergent steering force on the basis of the motion model of the vehicle in the planar direction to which an input by steering torque is reflected.

By virtue of such construction, it is possible to calculate the convergent steering force, highly accurately, on the basis of the momentum generated by the vehicle and the torque when the front wheels are steered.

(4) Cooperation with Steering by Driver

In another aspect of the vehicle steering control apparatus of the present invention, the steering force applying device reduces the convergent steering force, if at least one of an absolute value of a steering angle and an absolute value of a steering speed is equal to or smaller than a predetermined fourth threshold value.

According to this aspect, considering that the driver easily feels a change in the steering feeling (e.g. a change in steering torque) in the range that the absolute value of the steering angle and/or the absolute value of the steering speed are relatively small, it is possible to prevent the steering feeling from becoming bad by reducing the convergent steering force (moreover, by reducing the convergent steering force to the limit, to thereby set the convergent steering force to 0).

Incidentally, instead of applying the convergent steering force (i.e. setting the convergent steering force to 0), a basic steering force may be applied, which is a steering force based on the steering torque according to the steering operation by the driver. Similarly, in the explanation below, when the convergent steering force is reduced, the basic steering force may be applied by setting the convergent steering force to 0.

In another aspect of the vehicle steering control apparatus of the present invention, the steering force applying device reduces the convergent steering force, if at least one of an absolute value of a steering angle and an absolute value of a steering speed is equal to or larger than a predetermined fifth threshold value (wherein the fifth threshold value is larger than the aforementioned fourth threshold value).

According to this aspect, considering that there is a high possibility that the driver is performing steering for avoiding the trouble if the absolute value of the steering angle and the absolute value of the steering speed are excessively large, it is possible to prevent the deterioration of an avoidance performance by reducing the convergent steering force.

In another aspect of the vehicle steering control apparatus of the present invention, the steering force applying device reduces the convergent steering force, if a steering direction by a driver of the vehicle is opposite to a direction in which the steering force is applied.

According to this aspect, considering that there is a high possibility that the driver is performing the steering for avoiding the trouble if the steering direction is opposite to the direction in which the steering force is applied, it is possible to prevent the deterioration of an avoidance performance by reducing the convergent steering force or by setting the convergent steering force to 0.

In another aspect of the vehicle steering control apparatus of the present invention, the steering force applying device applies the steering force to the rear wheels, if a steering direction by a driver of the vehicle is opposite to a direction in which the steering force is applied.

According to this aspect, it is possible to prevent the driver's steering feeling from becoming bad by steering the rear wheels. In this case, the basic steering force may be applied to the front wheels.

In an aspect of the vehicle steering control apparatus in which the convergent steering force is reduced or the steering force is applied to the rear wheels if the steering direction by the driver is opposite to the direction in which the steering force is applied, as described above, the steering force applying device may apply the convergent steering force, even if the steering direction by the driver of the vehicle is opposite to the direction in which the steering force is applied, in a case that steering vibration occurs.

By virtue of such construction, when the steering vibration occurs or is to occur, it is possible to emphasize the stability of the vehicle (i.e. preventing the yaw oscillation from occurring) more than the avoidance performance, by applying the convergent steering force.

(5) Back-and-Forth Force Control

In another aspect of the vehicle steering control apparatus of the present invention, the steering force applying device reduces the convergent steering force, if back-and-forth force control, which changes a back-and-forth force of the vehicle, is performed on the vehicle.

According to this aspect, the convergent steering force is reduced, considering that the lateral force of the rear wheels is easily changed or a predetermined lateral force is not necessarily obtained by steering the front wheels in a case that the back-and-forth force control (specifically, e.g. ABS (Antilock Braking System) control, VSC (Vehicle Stability Control), TRC (Traction Control)) is performed.

Moreover, the convergent steering force may be reduced even in the case that there is a high possibility to start the back-and-forth force control, in addition to the case that the back-and-forth force control is actually performed.

In an aspect of the vehicle steering control apparatus in which the convergent steering force is reduced if the back-and-forth force control is performed, as described above, the steering force applying device may calculate the convergent steering force on the basis of each of a proportional value of the lateral force of the rear wheels and a differential value of the lateral force of the rear wheels, if the back-and-forth force control is not performed on the vehicle, and the steering force applying device may calculate the convergent steering force on the basis of the proportional value of the lateral force of the rear wheels and the differential value of the lateral force of the rear wheels while reducing a contribution ratio of the proportional value of the lateral force of the rear wheels, compared to the case that the back-and-forth force control is not performed, if the back-and-forth force control is performed on the vehicle.

By virtue of such construction, it is possible to calculate the convergent steering force by reducing the contribution ratio of the proportional value of the lateral force which can be significantly changed due to the back-and-forth force control (in other words, by increasing the contribution ratio of the differential value of the lateral force which is not so significantly changed even due to the change in the speed of the vehicle). Thus, it is possible to prevent the convergent steering force which changes excessively or significantly from being applied.

Incidentally, the convergent steering force may be calculated on the basis of the differential value of the lateral force by setting the contribution ratio of the proportional value of the lateral force to 0. Similarly, in the explanation below, when the contribution ratio of the proportional value of the lateral force is reduced, the convergent steering force may be calculated on the basis of the differential value of the lateral force by setting the contribution ratio of the proportional value of the lateral force to 0.

In an aspect of the vehicle steering control apparatus in which the convergent steering force is calculated while reducing the contribution ratio of the proportional value of the rear wheels if the back-and-forth force control is performed, as described above, the steering force applying device may not apply the convergent steering force, if the back-and-forth force control, which changes the back-and-forth force of the vehicle, is performed, and the steering force applying device may firstly apply the convergent steering force calculated on the basis of the differential value of the lateral force of the rear wheels during a predetermined period after the back-and-forth force control is ended and then apply the convergent steering force calculated by gradually increasing the contribution ratio of the proportional value of the lateral force of the rear wheels in the course of time.

By virtue of such construction, if the proportional value of the lateral force can significantly change even after the back-and-forth force control is ended, firstly the convergent steering force can be calculated on the basis of the differential value of the lateral force, and then the convergent steering force can be calculated on the basis of the proportional value and the differential value while increasing the contribution ratio of the proportional value in accordance with that the change in the proportional value of the lateral force gradually decreases in the course of time.

In another aspect of the vehicle steering control apparatus of the present invention, the steering force applying device calculates the convergent steering force on the basis of each of a proportional value of the lateral force of the rear wheels and a differential value of the lateral force of the rear wheels, while reducing a contribution ratio of the proportional value of the lateral force of the rear wheels more as acceleration or deceleration of the vehicle increase.

According to this aspect, it is possible to calculate the convergent steering force by reducing the contribution ratio of the proportional value of the lateral force which can be significantly changed due to the large acceleration or deceleration (in other words, by increasing the contribution ratio of the differential value of the lateral force which is not so significantly changed even due to the change in the speed of the vehicle). Thus, it is possible to prevent the convergent steering force which changes excessively or significantly from being applied.

Incidentally, while a pitch occurs because of the large acceleration or deceleration, the convergent steering force may be calculated on the basis of each of the proportional value of the lateral force of the rear wheels and the differential value of the lateral force of the rear wheels, while reducing the contrition ratio of the proportional value of the lateral force of the rear wheels, compared to the case that no pitch occurs.

In another aspect of the vehicle steering control apparatus of the present invention, the steering force applying device calculates the convergent steering force on the basis of each of a proportional value of the lateral force of the rear wheels and a differential value of the lateral force of the rear wheels while reducing a contribution ratio of the proportional value of the lateral force of the rear wheels, compared to a case that acceleration and deceleration of the vehicle is stable, in a predetermined period after the acceleration or deceleration start to change.

The proportional value of the lateral force can significantly change in the predetermined period after the acceleration or deceleration start to change (in other words, in the period until the pitch of the vehicle which is caused by the acceleration or deceleration converges). Thus, according to this aspect, the convergent steering force can be calculated by reducing the contribution ratio of the proportional value. Thus, it is possible to prevent the convergent steering force which changes excessively or significantly from being applied. That is, while the pitch occurs because of the large acceleration or deceleration, the convergent steering force can be calculated on the basis of each of the proportional value of the lateral force of the rear wheels and the differential value of the lateral force of the rear wheels, while reducing the contrition ratio of the proportional value of the lateral force of the rear wheels, compared to the case that no pitch occurs.

(6) Vertical Load

In another aspect of the vehicle steering control apparatus of the present invention, the steering force applying device reduces the convergent steering force, if a load control which changes a vertical load of the front wheels is performed.

According to this aspect, the convergent steering force is reduced, considering that the lateral force of the rear wheels is easily changed or the desired lateral force is not necessarily obtained by steering the front wheels if the load control (specifically, e.g. suspension control, stabilizer control or the like) is performed.

Moreover, the convergent steering force may be reduced even in the case that there is a high possibility to start the load control in addition to the case that the load control is actually performed. The convergent steering force may be further reduced as a change per unit of the load increases. Moreover, as in the case that the back-and-forth force control is performed, the convergent steering force may be calculated on the basis of the proportional value of the lateral force of the rear wheels and the differential value of the lateral force of the rear wheels while reducing the contribution ratio of the proportional value of the lateral force of the rear wheels, compared to the case that the load control is not performed.

(7) Tuck-in

In another aspect of the vehicle steering control apparatus of the present invention, the steering force applying device reduces the convergent steering force, if there is a possibility that tuck-in occurs in the vehicle or if the tuck-in occurs.

According to this aspect, the convergent steering force is reduced, considering that the lateral force of the rear wheels is easily changed due to tuck-in or the desired lateral force is not necessarily obtained by the steering of the front wheels.

Incidentally, if there is the possibility that the tuck-in occurs or if the tuck-in occurs, the steering force which can steer the front wheels in a direction of avoiding the spin of the vehicle may be applied in order to ensure the stability of the vehicle.

(8) Vibration Eigenvalue of Front Wheels

In another aspect of the vehicle steering control apparatus of the present invention, the steering force applying device is provided with a vibration eigenvalue changing device for changing a vibration eigenvalue of the front wheels in a case that there is a possibility that the lateral force of the rear wheels vibrates the front wheels.

According to this aspect, even if there is the possibility that the lateral force generated on the rear wheels vibrates the front wheels or even if there is the possibility that the yaw oscillation occurs in the vehicle, it is possible to prevent the steering vibration and the yaw oscillation from being coupled to each other by changing the vibration eigenvalue of the front wheels. This can result in the convergence in the vibration of the front wheels. That is, it is possible to improve the convergence of the vehicle while improving the convergence of the steering.

In an aspect of the vehicle steering control apparatus provided with the vibration eigenvalue changing device, as described above, the vibration eigenvalue changing device may be able to steer each of the front wheel which is located on right side and the front wheel which is located on left side at different rudder angle, respectively, and the vibration eigenvalue changing device may apply a steering force for steering the front wheels to toe-in direction, if there is the possibility that the lateral force of the rear wheels vibrates the front wheels.

By virtue of such construction, the cornering power is changed by steering the front wheels in toe-in direction. Thus, it is possible to change the vibration eigenvalue of the front wheels.

These effects and other advantages of the present invention will become more apparent from the embodiment explained below.

BRIEF DESCRIPTION OF DRAWINGS

FIG. 1 is an outline structural view conceptually showing the basic structure of an embodiment of the vehicle steering control apparatus of the present invention.

FIG. 2 is a flowchart conceptually showing an entire operation of an electric power steering apparatus.

FIG. 3 is a flowchart showing a calculation operation of calculating target steering torque in a step S200 in FIG. 2.

FIG. 4 is a flowchart conceptually showing a judgment operation of judging an overshoot state in a step S210 in FIG. 3.

FIG. 5 is a flowchart conceptually showing an inverse assist judgment operation in a step S220 in FIG. 3.

FIG. 6 is a graph showing a steering angle and a steering speed.

FIG. 7 is a flowchart conceptually showing a calculation operation of calculating basic steering torque in a step S230 in FIG. 3.

FIG. 8 is a graph showing a relationship between steering torque and the basic steering torque.

FIG. 9 is a flowchart conceptually showing a calculation operation of calculating convergent steering torque in a step S240 in FIG. 3.

FIG. 10 is a graph showing a relationship between a vehicle-speed dependence coefficient and a vehicle speed.

FIG. 11 is a graph showing a relationship between a vehicle-speed dependence coefficient and a vehicle speed.

FIG. 12 is a graph showing the value of a back-and-forth acceleration coefficient with respect to the absolute value of back-and-forth acceleration.

FIG. 13 is a graph showing the value of the back-and-forth acceleration coefficient with respect to an elapsed time from the start of changing the back-and-forth acceleration.

FIG. 14 is a graph showing the values of ABS coefficients with respect to time.

FIG. 15 is an outline structural view conceptually showing the basic structure of a first modified example of the embodiment of the vehicle steering control apparatus of the present invention.

FIG. 16 is an outline structural view conceptually showing the basic structure of a second modified example of the embodiment of the vehicle steering control apparatus of the present invention.

DESCRIPTION OF REFERENCE CODES 1 vehicle
5, 6 front wheel
7, 8 rear wheel
10 electric power steering apparatus
11 steering wheel
13 steering angle sensor
14 torque sensor
15, 55 electric motor
30 ECU
31 roll angle calculation circuit
32 tuck-in judgment circuit
33 ABS control circuit
34 SUS (suspension) control circuit
41 vehicle speed sensor
42 lateral force sensor
61, 62 active steering actuator

BEST MODE FOR CARRYING OUT THE INVENTION

Hereinafter, the best mode for carrying out the invention will be explained in each embodiment in order, with reference to the drawings.

(1) Basic Structure

Firstly, with reference to FIG. 1, an explanation will be given on the basic structure of an embodiment of the vehicle steering control apparatus of the present invention. FIG. 1 is an outline structural view conceptually showing the basic structure of the embodiment of the vehicle steering control apparatus of the present invention.

As shown in FIG. 1, a vehicle 1 is provided with front wheels 5 and 6 and rear wheels 7 and 8. At least either one of the front wheels and the rear wheels are driven by obtaining the driving force of an engine. At the same time, the front wheels are steered, so that the vehicle 1 can travel in a desired direction.

The front wheels 5 and 6, which are steered wheels, are steered by an electric power steering apparatus 10, which is driven in accordance with the steering of a steering wheel 11 by a driver. Specifically, the electric power steering apparatus 10 is, for example, a rack-and-pinion electric power steering apparatus, and it is provided with: a steering shaft 12 whose one end is connected to the steering wheel 11; a rack-and-pinion mechanism 16 connected to the other end of the steering shaft 12; a steering angle sensor 13 for detecting an steering angle θ, which is a rotational angle of the steering wheel 11; a torque sensor 14 for detecting steering torque MT applied to the steering shaft 12 by steering the steering wheel 11; and an electric motor 15 for generating an assist steering force which reduces a driver's steering load and for applying the assist steering force to the steering shaft 12 through a not-illustrated reduction gear.

In the electric power steering apparatus 10, an ECU 10 calculates target steering torque T, which is torque to be generated by the electric motor 15, on the basis of the steering angle θ which is outputted from the steering angle sensor 13, the steering torque MT which is outputted from the torque sensor 14, a roll angle RA of the vehicle 1 which is outputted from a roll angle calculation circuit 31, a control signal S1 which is outputted from a tuck-in judgment circuit 32 and which indicates whether or not tuck-in occurs, a control signal S2 which is outputted from an ABS control circuit 33 and which indicates whether or not ABS control is performed, a control signal S3 which is outputted from a suspension (SUS) control circuit 34 and which indicates whether or not stabilizer control or suspension control is performed, a vehicle speed V which is outputted from a vehicle speed sensor 41, and a lateral force $F_f$ of the front wheels and a lateral force $F_r$ of the rear wheels which are outputted from a lateral force sensor 42.

In this case, the roll angle calculation circuit 31 calculates the roll angle RA on the basis of lateral gravity (G) detected by a lateral G sensor 43. The tuck-in judgment circuit 32 generates the control signal S1 which indicates whether or not the tuck-in occurs, on the basis of a yaw rate γ detected by a yaw rate sensor 44 and a throttle opening amount O detected by a throttle opening amount sensor 45.

The target steering torque T is outputted from the ECU 30 to the electric motor 15, and an electric current according to the target steering torque T is supplied to the electric motor 15, by which the electric motor 15 is driven. By this, a steering assist force is applied from the electric motor 15 to the steering shaft 12, which results in a reduction of the driver's steering load. Moreover, by virtue of the rack-and-pinion mechanism 16, a force in the rotational direction of the steering shaft 12 is converted to a force in a reciprocating direction of a rack bar 17. The both ends of the rack bar 17 are respectively coupled to the front wheels 5 and 6 through a tie rod 18, and the direction of the front wheels 5 and 6 is changed in accordance with the reciprocating motion of the rack bar 17.

Incidentally, the lateral force sensor 42 may directly detect the lateral forces $F_f$ and $F_r$. Alternatively, instead of providing the lateral force sensor 42, for example, the ECU 30 may estimate (in other words, calculate) the lateral forces $F_f$ and $F_r$ on the basis of another parameter by operation or calculation or the like. Similarly, in other various sensors, the detection target of the sensors may be directly detected by providing the sensors. Alternatively, instead of providing the sensors, for example, the ECU 30 may estimate the detection target of the sensors on the basis of another parameter by operation or calculation or the like.

(2) Operation Principle

Next, with reference to FIG. 2 to FIG. 14, a more detailed explanation will be given on the operation of the electric power steering apparatus 10 in the embodiment.

FIG. 2 is a flowchart conceptually showing an entire operation of the electric power steering apparatus 10. As shown in FIG. 2, if an ignition is ON (step S100: Yes), the electric power steering apparatus 10 is driven. Specifically, the target steering torque T is calculated by the operation of the ECU 30 (step S200), and steering torque control is performed by driving the electric motor 15 in accordance with the calculated target steering torque T (step S300).

FIG. 3 is a flowchart showing the calculation operation of calculating the target steering torque T in the step S200 in FIG. 2. As shown in FIG. 3, if the target steering torque T is calculated, firstly, it is judged whether or not the steering is in an overshoot state (or there is the possibility that the steering is in the overshoot state) (step S210). In other words, it is judged whether or not the steering vibration and the yaw oscillation of the vehicle are coupled to each other to make the vehicle 1 in a wobbly state (or there is a possibility to make the vehicle 1 in the wobbly state). Incidentally, the judgment operation of judging the overshoot state in the step S210 will be detailed later with reference to FIG. 4.

As a result of the judgment in the step S210, if it is judged that the steering is not in the overshoot state (or there is no possibility that the steering is in the overshoot state) (the step S210: No), basic steering torque is calculated as the target steering torque T in such an aspect that will be detailed with reference to FIG. 7 and FIG. 8 (step S230).

On the other hand, as a result of the judgment in the step S210, if it is judged that the steering is in the overshoot state (or there is the possibility that the steering is in the overshoot state) (the step S210: Yes), then inverse assist judgment is performed which judges whether or not a steering direction of the steering wheel 11 by the driver is opposite to a direction of the steering force applied to the front wheels 5 and 6 (i.e. whether or not it is inverse assist) (step S220). Incidentally, the inverse assist judgment operation in the step S220 will be detailed later with reference to FIG. 5 and FIG. 6. As a result of the judgment in the step S220, if it is judged to be the inverse assist (the step S220: Yes), the basic steering torque is calculated as the target steering torque T (the step S230).

As a result of the judgment in the step S220, if it is judged not to be the inverse assist (the step S220: No), convergent steering torque is calculated as the target steering torque T in such an aspect that will be detailed with reference to FIG. 9 to FIG. 14 (step S240).

FIG. 4 is a flowchart conceptually showing the judgment operation of judging the overshoot state in the step S210 in FIG. 3. As shown in FIG. 4, in order to judge whether or not the steering is in the overshoot state, firstly, it is judged whether or not a ratio of the lateral force $F_r$ of the rear wheels 7 and 8 to a rudder angle δ of the front wheels 5 and 6 is larger than a predetermined threshold value OS1 (step S211).

As a result of the judgment in the step S211, if it is judged that the ratio of the lateral force $F_r$ of the rear wheels 7 and 8 to the rudder angle δ of the front wheels 5 and 6 is larger than the predetermined threshold value OS1 (the step S211: Yes), it is judged that the steering is in the overshoot state (step S214). Therefore, the convergent steering torque is calculated as the target steering torque T.

On the other hand, as a result of the judgment in the step S211, if it is judged that the ratio of the lateral force $F_r$ of the rear wheels 7 and 8 to the rudder angle δ of the front wheels 5 and 6 is not larger than the predetermined threshold value OS1 (the step S211: No), then it is judged whether or not a ratio of the roll angle RA to the rudder angle δ of the front wheels 5 and 6 is larger than a predetermined threshold value OS 2 (step S212).

As a result of the judgment in the step S212, if it is judged that the ratio of the roll angle RA to the rudder angle δ of the front wheels 5 and 6 is larger than the predetermined threshold value OS2 (the step S212: Yes), it is judged that the steering is in the overshoot state (the step S214). Therefore, the convergent steering torque is calculated as the target steering torque T.

On the other hand, as a result of the judgment in the step S212, if it is judged that the ratio of the roll angle RA to the rudder angle δ of the front wheels 5 and 6 is not larger than the predetermined threshold value OS2 (the step S212: No), it is judged that the steering is not in the overshoot state (i.e. the steering is stable) (the step S213). Therefore, the basic steering torque is calculated as the target steering torque T.

Incidentally, in addition to or instead of the judgment in the step S211, it may be judged whether or not a ratio (i.e. $F_r/F_f$) of the lateral force $F_r$ of the rear wheels 7 and 8 to the lateral force $F_f$ of the rear wheels 5 and 6 is larger than a predetermined threshold value OS3. If it is judged that the ratio of the lateral force $F_r$ of the rear wheels 7 and 8 to the lateral force $F_f$ of the rear wheels 5 and 6 is larger than the predetermined threshold value OS3, it is judged that the steering is in the overshoot state. If it is judged that the ratio of the lateral force $F_r$ of the rear wheels 7 and 8 to the lateral force $F_f$ of the rear wheels 5 and 6 is not larger than the predetermined threshold value OS3, then the judgment in the step S212 is performed.

Moreover, each of the threshold values OS1, OS2, and OS3 is preferably set to preferable value for each vehicle 1 equipped with the electric power steering apparatus 10, experimentally, experientially, mathematically, theoretically, or by using simulations or the like, in view of various features of the vehicle 1 or the like, on the basis of a hysteresis loop between the rudder angle δ of the front wheels 5 and 6 and the lateral force $F_r$ of the rear wheels 7 and 8, a hysteresis loop between the rudder angle δ of the front wheels 5 and 6 and the roll angle RA, and a hysteresis loop of the lateral force $F_r$ of the rear wheels 7 and 8 to the lateral force $F_f$ of the front wheels 5 and 6 (in particular, a hysteresis loop in the case that the vehicle speed is relatively low, and a hysteresis loop in the case that the vehicle speed is relatively high). The setting method, however, is not limited, as long as it can be preferably judged by using the threshold value whether or not the steering is in the overshoot state.

FIG. 5 is a flowchart conceptually showing the inverse assist judgment operation in the step S220 in FIG. 3. As shown in FIG. 5, in order to judge whether or not the inverse assist is performed, firstly, it is judged whether or not the steering direction of the steering wheel 11 by the driver is opposite to a direction in which the steering force applied by the electric motor 15 steers the front wheels 5 and 6 (step S221).

As a result of the judgment in the step S221, if it is judged that the steering direction of the steering wheel 11 by the driver is opposite to the direction in which the steering force applied by the electric motor 15 steers the front wheels 5 and 6 (the step S221: Yes), then it is judged whether or not the ratio of the lateral force $F_r$ of the rear wheels 7 and 8 to the rudder angle δ of the front wheels 5 and 6 is larger than a predetermined threshold value OS4 (step S225). Specifically, it is judged whether or not the steering vibration occurs. Thus, the threshold value OS4 is larger than the threshold value OS1. Moreover, even the threshold value OS4 is preferably set to a preferable value for each vehicle 1 equipped with the electric power steering apparatus 10, experimentally, experientially, mathematically, theoretically, or by using simulations or the like, in view of various features of the vehicle 1 or the like, on the basis of the hysteresis loop between the rudder angle δ of the front wheels 5 and 6 and the lateral force $F_r$ of the rear wheels 7 and 8. The setting method, however, is not limited, as long as it can be preferably judged whether or not the steering vibration occurs.

As a result of the judgment in the step S225, if it is judged that the ratio of the lateral force $F_r$ of the rear wheels 7 and 8 to the rudder angle δ of the front wheels 5 and 6 is larger than the predetermined threshold value OS4 (the step S225: Yes), it is judged not to be the inverse assist (step S226). Therefore, the convergent steering torque is calculated as the target steering torque T.

On the other hand, as a result of the judgment in the step S225, if it is judged that the ratio of the lateral force $F_r$ of the rear wheels 7 and 8 to the rudder angle δ of the front wheels 5 and 6 is not larger than the predetermined threshold value OS4 (the step S225: No), it is judged to be the inverse assist (step S227). Therefore, the basic steering torque is calculated as the target steering torque T.

On the other hand, as a result of the judgment in the step S221, if it is judged that the steering direction of the steering wheel 11 by the driver is not opposite to the direction in which the steering force applied by the electric motor 15 steers the front wheels 5 and 6 (the step S221: No), then it is judged whether or not an absolute value of the steering angle θ of the steering wheel 11 is smaller than a predetermined value OS5_1, and it is judged whether or not an absolute value of a steering speed (i.e. a steering angular velocity d θ) of the steering wheel 11 is smaller than a predetermined value OS5_2 (step S222).

As a result of the judgment in the step S222, if it is judged that the absolute value of the steering angle θ of the steering wheel 11 is smaller than the predetermined value OS5_1, and it is judged that the absolute value of the steering speed d θ of the steering wheel 11 is smaller than the predetermined value OS5_2 (the step S222: Yes), it is judged to be the inverse assist (the step S227). Therefore, the basic steering torque is calculated as the target steering torque T.

Incidentally, it may be judged to be the inverse assist, if the absolute value of the steering speed d θ of the steering wheel 11 is smaller than the predetermined value OS5_2, even if the absolute value of the steering angle θ of the steering wheel 11 is not smaller than the predetermined value OS5_1. Moreover, it may be judged to be the inverse assist, if the absolute value of the steering angle θ of the steering wheel 11 is smaller than the predetermined value OS5_1, even if the absolute value of the steering speed d θ of the steering wheel 11 is not smaller than the predetermined value OS5_2.

On the other hand, as a result of the judgment in the step S222, if it is judged that the absolute value of the steering angle θ of the steering wheel 11 is not smaller than the predetermined value OS5_1, or that the absolute value of the steering speed d θ of the steering wheel 11 is not smaller than the predetermined value OS5_2 (the step S222: No), then it is judged whether or not the absolute value of the steering angle θ of the steering wheel 11 is larger than a predetermined threshold value OS6_1 and it is judged whether or not the absolute value of the steering speed d θ of the steering wheel 11 is larger than a predetermined threshold value OS6_2 (step S223).

As a result of the judgment in the step S223, if it is judged that the absolute value of the steering angle θ of the steering wheel 11 is larger than a predetermined threshold value OS6_1 and it is judged that the absolute value of the steering speed d θ of the steering wheel 11 is larger than a predetermined threshold value OS6_2 (the step S223: Yes), it is judged to be the inverse assist (the step S227). Therefore, the basic steering torque is calculated as the target steering torque T.

Incidentally, it may be judged to be the inverse assist, if the absolute value of the steering speed d θ of the steering wheel 11 is larger than the predetermined value OS6_2, even if the absolute value of the steering angle θ of the steering wheel 11 is not larger than the predetermined value OS6_1. Moreover, it may be judged to be the inverse assist, if the absolute value of the steering angle θ of the steering wheel 11 is larger than the predetermined value OS6_1, even if the absolute value of the steering speed d θ of the steering wheel 11 is not larger than the predetermined value OS6_2.

On the other hand, as a result of the judgment in the step S223, if it is judged that the absolute value of the steering angle θ of the steering wheel 11 is not larger than the predetermined value OS6_1, or that the absolute value of the steering speed d θ of the steering wheel 11 is not larger than the predetermined value OS6_2 (the step S223: No), then it is judged whether or not the vehicle 1 is in a tuck-in state (or there is the possibility that the vehicle 1 is in the tuck-in state) (step S224). The judgment is performed on the basis of the control signal S1 which is outputted from the tuck-in judgment circuit 32.

As a result of the judgment in the step S224, if it is judged that the vehicle 1 is in the tuck-in state (or there is the possibility that the vehicle 1 is in the tuck-in state) (the step S224: Yes), it is judged to be the inverse assist (the step S227). Therefore, the basic steering torque is calculated as the target steering torque T.

On the other hand, as a result of the judgment in the step S224, if it is judged that the vehicle 1 is not in the tuck-in state (or there is no possibility that the vehicle 1 is in the tuck-in state) (the step S224: No), it is judged not to be the inverse assist (the step S226). Therefore, the convergent steering torque is calculated as the target steering torque T.

Here, a graph shown in FIG. 6 indicates the operations in the step S222 and the step S223 as a graph of the steering angle θ and the steering speed d θ. In the graph in FIG. 6, if combination of the steering angle θ and the steering speed d θ is in the hatching area, it is judged not to be the inverse assist. If a combination of the steering angle θ and the steering speed d θ is outside the hatching area, it is judged to be the inverse assist.

Incidentally, even the threshold values OS5_1, OS5_2, OS6_1 and OS6_2 are preferably set to preferable values for each vehicle 1 equipped with the electric power steering apparatus 10, experimentally, experientially, mathematically, theoretically, or by using simulations or the like, in view of various features of the vehicle 1 or the like.

FIG. 7 is a flowchart conceptually showing the calculation operation of calculating the basic steering torque in the step S230 in FIG. 3. As shown in FIG. 7, in order to calculate the basic steering torque, firstly, various signals (e.g. the vehicle speed V, the steering torque MT or the like) are read which are necessary to calculate the basic steering torque (step S231). Then, the basic steering torque is calculated on the basis of the various signals read in the step S231 (step S232).

Specifically, the basic steering torque is calculated on the basis of a graph showing a relationship between the steering torque MT and the basic steering torque shown in FIG. 8. In order to ensure a margin (looseness) in the steering wheel 11, the basic steering torque is calculated as 0 if the steering torque MT is relatively small. If the steering torque MT has a certain level of size, the calculated basic steering torque increases as the steering torque MT increases. If the steering torque MT is larger than a predetermined value, the calculated basic steering torque does not vary depending on the size of the steering torque MT and becomes a fixed value. At this time, the value of the basic steering torque may be reduced as the vehicle speed V increases.

FIG. 9 is a flowchart conceptually showing the calculation operation of calculating the convergent steering torque in the step S240 in FIG. 3. As shown in FIG. 9, in calculating the convergent steering torque, firstly, vehicle speed dependence coefficients $K_{V1}$ and $K_{V2}$ are set (step S241).

Specifically, the vehicle speed dependence coefficient $K_{V1}$ is set on the basis of a graph showing a relationship between the vehicle speed dependence coefficient $K_{V1}$ and the vehicle speed V shown in FIG. 10. In the same manner, the vehicle speed dependence coefficient $K_{V2}$ is set on the basis of a graph showing a relationship between the vehicle speed dependence coefficient $K_{V2}$ and the vehicle speed V shown in FIG. 11.

The vehicle speed dependence coefficients $K_{V1}$ and $K_{V2}$ shown in FIG. 10 and FIG. 11 can be obtained by motion equations which indicate the motion of the vehicle 1 in a planar direction. Specifically, the motion equations of the vehicle 1 are expressed by equations 1 to 4 wherein the inertia moment of the vehicle 1 is I, a distance between a front shaft and the position of the center of gravity of the vehicle 1 is $L_f$, a distance between a rear shaft and the position of the center of gravity of the vehicle 1 is $L_r$, a trail amount is $L_t$, a slip angle of the vehicle 1 is β, a cornering power on the front wheel side is $K_f$, and a cornering power on the rear wheel side is $K_r$.

$$I\dot{\gamma} = F_f L_f - F_r L_r \quad \text{[Equation 1]}$$

$$mV(\dot{\beta}+\gamma) = F_f + F_r \quad \text{[Equation 2]}$$

$$F_f = 2K_f\left(\delta - \beta - \frac{L_f}{V}\gamma\right) \quad \text{[Equation 3]}$$

$$F_r = 2K_r\left(-\beta + \frac{L_r}{V}\gamma\right) \quad \text{[Equation 4]}$$

Moreover, in the embodiment, the electric power steering apparatus 10 adopts a torque input method. Thus, the following equation 5 applies, wherein the inertia moment of the front wheels 5 and 6 is $I_h$, the coefficient of viscosity $C_h$, and the steering torque is $T_h$.

$$I_h\ddot{\delta}+C_h\dot{\delta}+F_f L_t = T_h \quad \text{[Equation 5]}$$

If the target steering torque T is obtained (i.e. if an equation obtained by applying the target steering torque T to the right side of the equation 5 is solved) by using the equations 1 to 5 with a focus on inhibiting the yaw oscillation of the vehicle 1 (in other words, increasing the damping of the vehicle 1), it turns out that it is necessary to set the target steering torque T (in this case, the convergent steering torque) on the basis of the lateral force $F_r$ of the rear wheels 7 and 8 and the differential value of the lateral force $F_r$. Specifically, it turns out that it is necessary to set the target steering torque T to the sum of a value obtained by multiplying the lateral force $F_r$ of the rear wheels 7 and 8 by a certain coefficient A and a value obtained by multiplying the differential value $dF_r$ of the lateral force $F_r$ of the rear wheels 7 and 8 by a certain coefficient B. The coefficients A and B correspond to the vehicle speed dependence coefficients $K_{V1}$ and $K_{V2}$, respectively.

Each of the vehicle speed dependence coefficients $K_{V1}$ and $K_{V2}$ obtained in the above manner varies depending on the vehicle speed V, as shown in FIG. 10 and FIG. 11.

In particular, sign of the vehicle speed dependence coefficient $K_{V1}$ is reversed at a certain vehicle speed (specifically, in a neutral steering state). Specifically, the vehicle speed dependence coefficient $K_{V1}$ has a positive value below the certain vehicle speed, and the vehicle speed dependence coefficient $K_{V1}$ has a negative value over the certain vehicle speed. This indicates that the target steering torque T is set in view of the steering in a direction opposite to the driver's steering direction (in other words, so as to make it harder for the driver to turn the steering wheel) in order to inhibit the over-steering (i.e. to inhibit the yaw oscillation of the vehicle) because the vehicle easily behaves over-steering beyond the certain speed. That is, it indicates that the target steering torque T is set so as to stabilize the behavior of the vehicle 1.

As described above, the convergent steering torque as the target steering torque T can be calculated on the basis of an equation of $K_{V1} \times F_r + K_{V2} \times dF_r$. However, on the contrary, depending on the behavior of the vehicle 1 or the like, applying the aforementioned convergent steering torque as it is may deteriorate the behavior of the vehicle 1. Therefore, in the embodiment, the convergent steering torque is calculated by further performing the following operation.

Specifically, in FIG. 9 again, firstly, a rough road coefficient $K_B$ is set (step S242). The rough road coefficient $K_B$ is set to a numerical value in a range between 0 and 1. If the vehicle 1 is driving on a rough road (e.g. a road on which the vehicle speed V significantly changes irregularly or unexpectedly, such as a low μ road and an uneven road), the rough road coefficient $K_B$ is set to 0. Alternatively, the rough road coefficient $K_B$ may set to a value which is larger than 0 and smaller than 1 if the vehicle 1 is driving on the rough road. On the other hand, if the vehicle 1 is not driving on the rough road (i.e. if the vehicle 1 is driving on a normal road, such as a paved road), the rough road coefficient $K_B$ is set to 1.

Then, a back-and-forth acceleration coefficient $K_A$ is set (step S243). The back-and-forth acceleration coefficient $K_A$ is set to a numerical value in a range between 0 and 1.

Specifically, the back-and-forth acceleration coefficient $K_A$ is set in accordance with a graph shown in FIG. 12. FIG. 12 is a graph showing the value of the back-and-forth acceleration coefficient $K_A$ to the absolute value of back-and-forth acceleration α. As shown in FIG. 12, if the absolute value of back-and-forth acceleration α of the vehicle 1 is equal to or smaller than a predetermined value, the back-and-forth acceleration coefficient $K_A$ is set to 1. If the absolute value of back-and-forth acceleration α of the vehicle 1 is equal to or larger than the predetermined value, the back-and-forth acceleration coefficient $K_A$ is set to be smaller as the absolute value of back-and-forth acceleration α of the vehicle 1 increases. Alternatively, if the absolute value of back-and-forth acceleration α of the vehicle 1 is equal to or larger than a predetermined value or if a pitch occurs in the vehicle 1, the back-and-forth acceleration coefficient $K_A$ may be set to 0.

Moreover, as shown in FIG. 13, the back-and-forth acceleration coefficient $K_A$ may be set in accordance with an elapsed time from the start of changing the back-and-forth acceleration α. FIG. 13 is a graph showing the value of the back-and-forth acceleration coefficient $K_A$ to an elapsed time from the start of changing the back-and-forth acceleration α. As shown in FIG. 13, if the back-and-forth acceleration α starts to change, the back-and-forth acceleration coefficient $K_A$ may be set to 0 until a time corresponding to a pitch cycle peculiar to the vehicle 1 elapses. The back-and-forth acceleration coefficient $K_A$ may be set to have a large value gradually in the course of time after the time corresponding to the pitch cycle elapses.

In FIG. 9 again, then ABS coefficients $K_{X1}$ and $K_{X2}$ are set (step S244). The ABS coefficients $K_{X1}$ and $K_{X2}$ are set to a numerical value in a range between 0 and 1.

Specifically, the ABS coefficients $K_{X1}$ and $K_{X2}$ are set in accordance with a graph shown in FIG. 14. FIG. 14 is a graph showing the values of the ABS coefficients $K_{X1}$ and $K_{X2}$ to time. As shown in FIG. 14, if ABS control is performed, each of the ABS coefficients $K_{X1}$ and $K_{X2}$ is set to 0. Whether or not the ABS control is performed can be judged from the control signal S2 which is outputted from the ABS control circuit 33. After that, if the ABS control is ended, firstly, the ABS coefficient $K_{X2}$ is set to have a larger value gradually as the time elapses. After a certain time elapses from the end of the ABS control, then the ABS coefficient $K_{X1}$ is set to have a larger value gradually as the time elapses. At this time, an increment per unit time of the ABS coefficient $K_{X2}$ is larger than an increment per unit time of the ABS coefficient $K_{X1}$. In other words, the slope of the graph associated with the ABS coefficient $K_{X1}$ is milder than the slope of the graph associated with the ABS coefficient $K_{X2}$ shown in FIG. 14.

Incidentally, instead of the operation of gradually increasing the ABS coefficient $K_{X1}$ and the ABS coefficient $K_{X2}$ after the ABS control is ended, the ABS coefficient $K_{X2}$ may be set to 1 and the ABS coefficient $K_{X1}$ may be set to 0 in a certain period after the end of the ABS control, and then the ABS coefficient $K_{X1}$ may be set to 1 after a certain period further elapses.

Moreover, even in the case that back-and-forth force control is performed, such as VSC and TRC, the ABS coefficients $K_{X1}$ and $K_{X2}$ are preferably set in the same aspect as that in the ABS control.

In FIG. 9 again, then a suspension (or SUS) coefficient $K_Z$ is set (step S245). The SUS coefficient $K_Z$ is set to a numerical value in a range between 0 and 1. Specifically, if the suspension control is not performed, the SUS coefficient $K_Z$ is set to 1. Whether or not the suspension control is performed can be judged from the control signal S3 which is outputted from the SUS control circuit 34. On the other hand, if the suspension control is performed, the SUS coefficient $K_Z$ is set to 0 or a value which is larger than 0 and smaller than 1.

Moreover, even in the case that vertical load control is performed, such as stabilizer control, the SUS coefficient $K_Z$ is preferably set in the same aspect as in the suspension control.

Incidentally, if the vehicle speed V is abnormal (e.g. if hydroplaning phenomenon or the like occurs), the vehicle-speed dependence coefficient $K_{V1}$ is preferably set to 0.

After that, a coefficient $K_1$ by which the lateral force $F_r$ of the rear wheels 7 and 8 is actually multiplied is calculated (step S246). Specifically, $K_1 = K_{V1} \times K_B \times K_A \times K_{X1} \times K_Z$. In the same manner, a coefficient $K_2$ by which the differential value $dF_r$ of the lateral force $F_r$ of the rear wheels 7 and 8 is actually multiplied is calculated (step S247). Specifically, $K_2 = K_{V2} \times K_{X2}$. After that, the lateral force $F_r$ of the rear wheels 7 and 8 and the differential value $dF_r$ of the lateral force $F_r$ of the rear wheels 7 and 8 are calculated (step S248). After that, the convergent steering torque is calculated on the basis of $K_1$ calculated in the step S246, $K_2$ calculated in the step S247, and $dF_r$ and $F_r$ calculated in the step S248 (step S249).

Here, if the steering direction of the steering wheel 11 by the driver is an turning or cutting direction, the steering assist force according to the calculated convergent steering torque is preferably applied from the electric motor 15 such that the front wheels 5 and 6 are steered in a neutral direction, compared to the case that the steering is judged not to be in the overshoot state (i.e. the case that it is judged to be No in the step S210 in FIG. 3). On the other hand, if the steering direction of the steering wheel 11 by the driver is a returning or reversing direction, the steering assist force according to the calculated convergent steering torque is preferably applied from the electric motor 15 such that the front wheels 5 and 6 are steered in an end direction, compared to the case that the steering is judged not to be in the overshoot state.

As explained above, according to the embodiment, it is possible to preferably judge whether or not the steering is in the overshoot state. Then, if the steering is in the overshoot state, the convergent steering torque can be set as the target steering torque T. By this, even if the steering is in the overshoot state, it is possible to prevent the vibration of the steering and the yaw oscillation of the vehicle from being coupled to each other (specifically from resonating in a reversed phase to each other). This can result in the convergence in the vibration of the front wheels 5 and 6. That is, it is possible to improve the convergence of the vehicle 1 while improving the convergence of the steering.

In addition, since the convergent steering torque is calculated on the basis of the motion equations in the planar direction of the vehicle 1 in view of the contribution by the torque input, it is possible to calculate the convergent steering torque highly accurately (or more optimally).

In addition, by monitoring the rudder angle δ of the front wheels 5 and 6, the lateral force $F_f$ of the front wheels 5 and 6, the lateral force $F_r$ of the rear wheels 7 and 8, the roll angle RA or the like, it is possible to judge whether or not the steering in the overshoot state, preferably or highly accurately.

In particular, since the ratio of the roll angle RA to the rudder angle δ of the front wheels 5 and 6 is monitored, as shown in the step S212 in FIG. 4, it is possible to judge whether or not the steering in the overshoot state, preferably or highly accurately, even in the vehicle 1 with a high vehicle height, such as a minivan and a SUV (Sport Utility Vehicle). Considering such a benefit, it may be constructed to perform the operation in the step S212 in FIG. 4 selectively on the vehicle with the high vehicle height, and not to perform the operation in the step S212 in FIG. 4 on the vehicle with a low vehicle height, such as a sports car type sedan and coupe.

Moreover, considering that the driver is highly likely performing emergency avoidance steering if the steering direction by the driver is opposite to the direction in which the steering force applied by the electric motor 15 steers the front wheels 5 and 6, as shown in the step S221 in FIG. 5, it is possible to prevent the deterioration of an avoidance performance by setting the basic steering force according to the driver's steering as the target steering target T. That is, it is possible to respect the driver's will of emergency avoidance.

However, even if the steering direction by the driver is opposite to the direction in which the steering force applied by the electric motor 15 steers the front wheels 5 and 6, if the steering vibration occurs or possibly occurs as shown in the step S225 in FIG. 5, it is possible to emphasize the stability of the vehicle 1 more than the steering feeling, by setting the convergent steering torque as the target steering torque T.

Incidentally, if the steering direction by the driver is opposite to the direction in which the steering force applied by the electric motor 15 steers the front wheels 5 and 6, it is also possible to reduce the coefficient $K_1$ by which the lateral force $F_r$ of the rear wheels 7 and 8 is actually multiplied, which is the basis to set the steering force in the opposite direction with respect to the steering direction by the driver. Moreover, it is also possible to reduce a contribution ratio of a proportional value of the lateral force $F_r$ of the rear wheels 7 and 8 when the convergent steering torque is calculated.

Moreover, considering that the driver easily feels a change in the steering feeling in the range that the absolute value of the steering angle θ and the absolute value of the steering speed d θ are relatively small, as shown in the step S222 in FIG. 5, the basic steering torque according to the steering torque MT is set as the target steering torque T, to thereby avoid the driver's steering feeling from becoming bad.

Moreover, considering that the driver is likely performing the emergency avoidance steering in the range that the absolute value of the steering angle θ and the absolute value of the steering speed d θ are relatively large, as shown in the step S223 in FIG. 5, it is possible to respect the driver's will of emergency avoidance, by setting the basic steering torque according to the steering torque MT as the target steering torque T.

Moreover, when the tuck-in occurs, considering that the lateral force $F_r$ of the rear wheels 7 and 8 is easily changed due to the tuck-in or the desired lateral force $F_r$ is not necessarily obtained by the steering of the front wheels 5 and 6 because of the tuck-in, as shown in the step S224 in FIG. 5, it is possible to set the basic steering torque according to the steering torque MT as the target steering torque T.

Moreover, when the vehicle 1 is driving on the rough road, as shown in the step S242 in FIG. 9, the convergent steering torque can be preferably calculated while eliminating an influence by the rough road as much as possible, by reducing the contribution ratio of the differential value $dF_r$ of the lateral force $F_r$ of the rear wheels 7 and 8 including large noise with respect to the calculation of the convergent steering torque, or by setting the contribution ratio to 0 (in other words, by calculating the convergent steering torque on the basis of the lateral force $F_r$ of the rear wheels 7 and 8 including small noise).

Moreover, when the vehicle 1 is accelerating or decelerating, as shown in the step S243 in FIG. 9, the convergent steering torque can be preferably calculated while eliminating an influence by the acceleration or the deceleration as much as possible, by reducing the contribution ratio of the lateral force $F_r$ of the rear wheels 7 and 8, which is significantly changed due to the acceleration or the deceleration, with respect to the calculation of the convergent steering torque, or by setting the contribution ratio to 0 (in other words, by calculating the convergent steering torque on the basis of the differential value $dF_r$ of the lateral force $F_r$ of the rear wheels 7 and 8, which is not so significantly changed even due to the acceleration and the deceleration).

Moreover, when the back-and-forth force control, such as the ABS control, is performed on the vehicle 1, as shown in the step S244 in FIG. 9, the convergent steering torque can be preferably calculated while eliminating an influence by the back-and-forth force control as much as possible, by reducing the contribution ratio of the lateral force $F_r$ of the rear wheels 7 and 8, which is significantly changed due to the back-and-forth force control, with respect to the calculation of the convergent steering torque, or by setting the contribution ratio to 0 (in other words, by calculating the convergent steering torque on the basis of the differential value $dF_r$ of the lateral force $F_r$ of the rear wheels 7 and 8, which is not so significantly changed even due to the back-and-forth force control).

Moreover, when the vertical load control, such as the suspension control, is performed, as shown in the step S245 in FIG. 9, the convergent steering torque can be preferably calculated while eliminating an influence by the vertical load control as much as possible, by reducing the contribution ratio of the lateral force $F_r$ of the rear wheels 7 and 8, which is significantly changed due to the vertical load control, with respect to the calculation of the convergent steering torque, or by setting the contribution ratio to 0 (in other words, by calculating the convergent steering torque on the basis of the differential value $dF_r$ of the lateral force $F_r$ of the rear wheels 7 and 8, which is not so significantly changed even due to the vertical load control).

Moreover, if the vehicle speed V is abnormal, the convergent steering torque can be preferably calculated while eliminating an influence by the abnormality of the vehicle speed V as much as possible, by reducing the contribution ratio of the lateral force $F_r$ of the rear wheels 7 and 8, which is significantly changed, with respect to the calculation of the convergent steering torque, or by setting the contribution ratio to 0 (in other words, by calculating the convergent steering torque on the basis of the differential value $dF_r$ of the lateral force $F_r$ of the rear wheels 7 and 8, which is not so significantly changed).

Incidentally, in the aforementioned embodiment, the front wheels 5 and 6 are steered on the basis of the steering torque MT and the target steering torque T. However, even in so-called active steering in which the steering of the front wheels 5 and 6 is performed by an actuator on the basis of the steering angle θ, it is possible to receive the aforementioned various benefits by performing the steering in the same aspect as that of the aforementioned operation if the steering is in the overshoot state.

(3) Modified Examples

Next, with reference to FIG. 15 and FIG. 16, an explanation will be given on modified examples of the electric power steering apparatus 10 in the embodiment.

(3-1) First Modified Example

FIG. 15 is an outline structural view conceptually showing the basic structure of a first modified example of the embodiment of the vehicle steering control apparatus of the present invention. As shown in FIG. 15, in the first modified example, in addition to the electric power steering apparatus 10 for steering the front wheels 5 and 6, an electric power steering apparatus 50 for steering the rear wheels 7 and 8 is further provided.

The electric power steering apparatus 50 is, for example, a rack-and-pinion electric power steering apparatus, and it is provided with: an electric motor 55 for generating an assist steering force to steer the rear wheels 7 and 8 and for applying the assist steering force to a steering shaft 52 through a not-illustrated reduction gear; and a rack-and-pinion mechanism 56.

In the first modified example in such a structure, the rear wheels 7 and 8 are steered if the steering direction of the steering wheel 11 by the driver is opposite to the direction in which the steering force applied by the electric motor 15 steers the front wheels 5 and 6. At this time, the aforementioned basic steering torque is outputted as the target torque T from the ECU 30 to the electric motor 15 for steering the front wheels 5 and 6.

By steering the rear wheels 7 and 8, it is possible to change yaw moment on the vehicle 1 side. That is, in the embodiment explained with reference to FIG. 1 to FIG. 14, the yaw moment of the steering is changed by setting the convergent steering torque T as the target steering torque T of the electric motor 15. In the first modified example, however, the yaw moment on the vehicle 1 side is changed. Even if the yaw moment on the vehicle 1 side is changed in this manner, it is possible to prevent the vibration of the steering and the yaw oscillation of the vehicle from being coupled to each other (specifically, from resonating in the reverse phase to each other), as described above. This can result in the convergence in the vibration of the front 5 and 6. That is, it is possible to improve the convergence of the vehicle 1 while improving the convergence of the steering.

In addition, since the front wheels 5 and 6 are steered by setting the basic steering torque according to the steering torque MT as the target steering torque T, there is such a benefit that the driver's steering feeling does not becomes bad.

(3-2) Second Modified Example

FIG. 16 is an outline structural view conceptually showing the basic structure of a second modified example of the embodiment of the vehicle steering control apparatus of the present invention. As shown in FIG. 16, in the second modified example, there are provided an active steering actuator 61 for steering the front wheel 5 and an active steering actuator 62 for steering the front wheel 6. The active steering actuators 61 and 62 steer the front wheels 5 and 6, respectively, such that the rudder angle of the front wheel 5 becomes $\delta_L$ and the rudder angle of the front wheel 6 becomes $\delta_R$, on the basis of a target rudder angle $\delta_L$ of the front wheel 5 and a target rudder angle $\delta_R$ of the front wheel 6, which are outputted from the ECU 30.

In the second modified example, as described above, if it is judged that the steering is in the overshoot state, the target rudder angles $\delta_L$ and $\delta_R$ are set such that the front wheels 5 and 6 are toe-in.

As described above, by setting the front wheels 5 and 6 to be toe-in, it is possible to change a cornering power $C_p$ of the front wheels 5 and 6, to thereby change the vibration eigenvalue of the front wheels 5 and 6. By this, it is possible to prevent the vibration of the steering and the yaw oscillation of the vehicle from being coupled to each other (specifically, from resonating in the reverse phase to each other), as described above. This can result in the convergence in the vibration of the front 5 and 6 converge. That is, it is possible to improve the convergence of the vehicle 1 while improving the convergence of the steering.

The present invention is not limited to the aforementioned embodiment, and various changes may be made without departing from the essence or spirit of the invention which can be read from the claims and the entire specification. A vehicle steering control apparatus, which involves such changes, is also intended to be within the technical scope of the present invention.

The invention claimed is:

1. A vehicle steering control apparatus comprising:
    a steering force applying device that applies a steering force at least to front wheels; and
    a lateral force detecting device for detecting a lateral force of each of the front wheels and rear wheels,
    wherein, if a ratio of the lateral force of the rear wheels to the lateral force of the front wheels is determined to be a ratio of possibly causing yaw oscillation in a vehicle, said steering force applying device applies, to the front wheels, a convergent steering force which steers the front wheels in a direction in which the yaw oscillation converges, and
    said steering force applying device includes a vibration eigenvalue changing device that changes a vibration eigenvalue of the front wheels in a case where there is a possibility that the lateral force of the rear wheels vibrates the front wheels.

2. The vehicle steering control apparatus according to claim 1, wherein said steering force applying device applies, as the convergent steering force, a steering force which steers the front wheels in a neutral direction, compared to a case that the ratio of the lateral force of the rear wheels to the lateral force of the front wheels is not determined to be the ratio of possibly causing the yaw oscillation in the vehicle, if steering by a driver of the vehicle is in a turning or cutting state, and
    wherein said steering force applying device applies, as the convergent steering force, a steering force which steers the front wheels in an end direction, compared to the case that the ratio of the lateral force of the rear wheels to the lateral force of the front wheels is not determined to be the ratio of possibly causing the yaw oscillation in the vehicle, if the steering by the driver of the vehicle is in a returning or reversing state.

3. The vehicle steering control apparatus according to claim 1, wherein said steering force applying device applies the steering force so as to control a rudder angle of the front wheels.

4. The vehicle steering control apparatus according to claim 1, wherein said steering force applying device controls the steering force applied to the front wheels based on steering torque according to a steering operation of a driver of the vehicle.

5. The vehicle steering control apparatus according to claim 1, wherein said steering force applying device applies the convergent steering force depending on the ratio of the lateral force of the rear wheels to the lateral force of the front wheels.

6. The vehicle steering control apparatus according to claim 5, wherein said steering force applying device applies the convergent steering force depending on a ratio of the lateral force of the rear wheels to a rudder angle of the front wheels.

7. The vehicle steering control apparatus according to claim 1, wherein said steering force applying device applies the convergent steering force depending on a ratio of a roll angle of the vehicle to a rudder angle of the front wheels.

8. The vehicle steering control apparatus according to claim 1, wherein said steering force applying device calculates the convergent steering force based on each of a proportional value of the lateral force of the rear wheels and a differential value of the lateral force of the rear wheels.

9. The vehicle steering control apparatus according to claim 1, wherein said steering force applying device corrects the convergent steering force in accordance with a speed of the vehicle.

10. The vehicle steering control apparatus according to claim 9, wherein said steering force applying device reduces the convergent steering force if the vehicle is driving on a rough road.

11. The vehicle steering control apparatus according to claim 10, wherein said steering force applying device calculates the convergent steering force based on each of a proportional value of the lateral force of the rear wheels and a differential value of the lateral force of the rear wheels, while reducing a contribution ratio of the differential value of the lateral force of the rear wheels, compared to a case that the vehicle is driving on a normal road, if the vehicle is driving on the rough road.

12. The vehicle steering control apparatus according to claim 1, wherein said steering force applying device calculates the convergent steering force based on a motion model of the vehicle in a planar direction.

13. The vehicle steering control apparatus according to claim 12, wherein said steering force applying device calculates the convergent steering force based on the motion model of the vehicle in the planar direction to which an input by steering torque is reflected.

14. The vehicle steering control apparatus according to claim 1, wherein said steering force applying device reduces the convergent steering force depending on at least one of an absolute value of a steering angle and an absolute value of a steering speed.

15. The vehicle steering control apparatus according to claim 1, wherein said steering force applying device reduces the convergent steering force if the steering direction is opposite to the direction in which the steering force is applied.

16. The vehicle steering control apparatus according to claim 1, wherein said steering force applying device applies the steering force to the rear wheels if a steering direction by a driver of the vehicle is opposite to a direction in which the steering force is applied.

17. The vehicle steering control apparatus according to claim 15, wherein said steering force applying device applies the convergent steering force even if the steering direction by the driver of the vehicle is opposite to the direction in which the steering force is applied, in a case that steering vibration occurs.

18. The vehicle steering control apparatus according to claim 1, wherein said steering force applying device reduces the convergent steering force if back-and-forth force control, which changes a back-and-forth force of the vehicle, is performed on the vehicle.

19. The vehicle steering control apparatus according to claim 18, wherein said steering force applying device calculates the convergent steering force based on each of a proportional value of the lateral force of the rear wheels and a differential value of the lateral force of the rear wheels, if the back-and-forth force control is not performed on the vehicle, and wherein said steering force applying device calculates the convergent steering force based on the proportional value of the lateral force of the rear wheels and the differential value of the lateral force of the rear wheels while reducing a contribution ratio of the proportional value of the lateral force of the rear wheels, compared to a case that the back-and-forth force control is not performed, if the back-and-forth force control is performed on the vehicle.

20. The vehicle steering control apparatus according to claim 19, wherein said steering force applying device does not apply the convergent steering force, if the back-and-forth force control, which changes the back-and-forth force of the vehicle, is performed, and wherein said steering force applying device firstly applies the convergent steering force calculated based on the differential value of the lateral force of the rear wheels during a predetermined period after the back-and-forth force control is ended and then applies the convergent steering force calculated by gradually increasing the contribution ratio of the proportional value of the lateral force of the rear wheels over time.

21. The vehicle steering control apparatus according to claim 1, wherein said steering force applying device calculates the convergent steering force based on each of a proportional value of the lateral force of the rear wheels and a differential value of the lateral force of the rear wheels, while reducing a contribution ratio of the proportional value of the lateral force of the rear wheels more as acceleration or deceleration of the vehicle increases.

22. The vehicle steering control apparatus according to claim 1, wherein said steering force applying device calculates the convergent steering force based on each of a proportional value of the lateral force of the rear wheels and a differential value of the lateral force of the rear wheels, while reducing a contribution ratio of the proportional value of the lateral force of the rear wheels, compared to a case that acceleration and deceleration of the vehicle is stable, in a predetermined period after the acceleration or deceleration starts to change.

23. The vehicle steering control apparatus according to claim 1, wherein said steering force applying device reduces the convergent steering force if a load control which changes a vertical load of the front wheels is performed.

24. The vehicle steering control apparatus according to claim 1, wherein said steering force applying device reduces the convergent steering force if there is a possibility that tuck-in occurs in the vehicle or if the tuck-in occurs.

25. The vehicle steering control apparatus according to claim 1, wherein the vibration eigenvalue changing device can steer each of the front wheels, which are located on a right side of the vehicle and on a left side of the vehicle, respectively, at different rudder angles, respectively, and wherein the vibration eigenvalue changing device applies a steering force for steering the front wheels to toe-in direction if there is the possibility that the lateral force of the rear wheels vibrates the front wheels.

* * * * *